United States Patent
Sedighy et al.

(10) Patent No.: US 7,257,146 B2
(45) Date of Patent: Aug. 14, 2007

(54) SYSTEM AND METHOD FOR CONTROLLING POWER ACROSS MULTIPLE ELECTRODES IN A FURNACE

(75) Inventors: Mohammad Sedighy, Ontario (CA); Thomas Lai Wai Ma, Toronto (CA)

(73) Assignee: Hatch Ltd., Mississauga (CA)

( * ) Notice: Subject to any disclaimer, the term of this patent is extended or adjusted under 35 U.S.C. 154(b) by 29 days.

(21) Appl. No.: 11/215,997

(22) Filed: Sep. 1, 2005

(65) Prior Publication Data
US 2006/0050758 A1    Mar. 9, 2006

Related U.S. Application Data

(60) Provisional application No. 60/606,342, filed on Sep. 1, 2004.

(51) Int. Cl.
*H05B 7/144* (2006.01)

(52) U.S. Cl. .................. 373/104; 373/102; 373/105

(58) Field of Classification Search ............... 373/104, 373/102, 103, 105–108; 323/209, 205, 208; 315/111.21, 111.51, 111.81, 111.91
See application file for complete search history.

(56) References Cited

U.S. PATENT DOCUMENTS

| | | |
|---|---|---|
| 2,450,159 A | 9/1948 | Pickslay |
| 2,632,862 A | 3/1953 | Stoltz |
| 3,597,518 A | 8/1971 | Roberts |
| 3,617,595 A | 11/1971 | Mulcahy |
| 3,767,832 A | 10/1973 | Bennett |
| 3,936,727 A | 2/1976 | Kelley, Jr. et al. |
| 3,968,422 A | 7/1976 | Waldmann |
| 3,987,359 A | 10/1976 | Thompson |
| 3,989,999 A | 11/1976 | Thompson et al. |
| 3,999,117 A | 12/1976 | Gyugyi et al. |
| 4,104,576 A | 8/1978 | Frank |
| 4,121,150 A | 10/1978 | Kelley, Jr. |
| 4,607,374 A | 8/1986 | Inagaki et al. |
| 4,663,764 A | 5/1987 | Bretthauer et al. |
| 4,677,643 A | 6/1987 | Dicks |

(Continued)

FOREIGN PATENT DOCUMENTS

DE        35 08 323         9/1985

(Continued)

OTHER PUBLICATIONS

English Translation of Publication of EP 0 589 544.

(Continued)

*Primary Examiner*—Quang Van
(74) *Attorney, Agent, or Firm*—Bereskin & Parr; Sylvan S. Browne

(57) ABSTRACT

A method and system for stabilizing energy consumption in multiple loads, or in single multi-phase loads. The method and system also compensates for unbalance in multi-phase loads. A central controller monitors variable reactances in the loads and identifies situations of power and/or current fluctuation and/or unbalance. It determines appropriate corrective action by the other loads/phases to compensate for the power and/or current change or unbalance due to the problematic load, and it issues control signals instructing variable reactor controllers associated with the other loads to adjust accordingly. The method and system may by applied to electric arc furnace installations. The system and method may be employed to maintain a predetermined level of unbalance in the system.

38 Claims, 15 Drawing Sheets

U.S. PATENT DOCUMENTS

| | | | |
|---|---|---|---|
| 4,698,581 A | 10/1987 | Shimamura et al. | |
| 4,725,939 A | 2/1988 | Boisdon | |
| 4,821,284 A | 4/1989 | Janiak et al. | |
| 5,032,738 A | 7/1991 | Vithayathil | |
| 5,115,447 A | 5/1992 | Bowman | |
| 5,138,630 A | 8/1992 | Suga | |
| 5,155,740 A * | 10/1992 | Ao et al. | 373/108 |
| 5,237,585 A | 8/1993 | Stenkvist | |
| 5,239,554 A | 8/1993 | Gensini et al. | |
| 5,255,285 A | 10/1993 | Aberl et al. | |
| 5,315,527 A | 5/1994 | Beckwith | |
| 5,406,581 A | 4/1995 | Staib et al. | |
| 5,438,588 A | 8/1995 | Wanner | |
| 5,463,653 A | 10/1995 | Du Parc et al. | |
| 5,583,883 A | 12/1996 | Paulsson et al. | |
| 5,617,447 A * | 4/1997 | Tambe | 373/108 |
| 5,677,925 A | 10/1997 | Du Parc et al. | |
| 5,991,327 A | 11/1999 | Kojori | |
| 6,226,313 B1 | 5/2001 | Thamodharan et al. | |
| 6,274,851 B1 | 8/2001 | Mulcahy et al. | |
| 6,573,691 B2 | 6/2003 | Ma et al. | |
| 6,603,795 B2 | 8/2003 | Ma et al. | |

FOREIGN PATENT DOCUMENTS

| | | |
|---|---|---|
| DE | 41 18 756 | 12/1992 |
| EP | 0 033 842 | 8/1981 |
| EP | 0 118 947 | 9/1984 |
| EP | 0 225 793 | 6/1987 |
| EP | 0 429 774 | 6/1991 |
| EP | 0 474 883 | 3/1992 |
| EP | 0 581 112 | 2/1994 |
| EP | 0 589 544 | 3/1994 |
| FR | 2 457 029 | 12/1980 |
| JP | 2 217782 | 8/1990 |
| JP | 2 302851 | 12/1990 |

OTHER PUBLICATIONS

Von E Markworth, "Lichtbogen-Ofenanlage mit Drosselspule," elektrowarme international 37 b 6, Dec. 1976, pp. 315-319.

T.L. Ma et al., The SPLC A New Technology for Arc Stabilization and Flicker Reduction on Electric Arc Furnaces, 1999 Electric Furnace Conference Proceedings, pp. 553-?.

S.B. Dewan et al., Application of 46kV, 100MVA Smart Predictive Line Controller (SPLC) to AC Electric Arc Furnaces, Power Engineering Society 1999 Winter Meeting, IEEE, vol. 2, Jan. 31-Feb. 1, 1999, pp. 1214-1218.

Mulcahy et al., A New Technology for Control of AC Arc Furnaces, Electric Furnace Conference Proceedings, vol. 35-1995, pp. 307-311.

T.L. Ma et al. Power System Design for High-Power Electric Smelting and Melting Furnaces, The Proceedings of the International Symposium on Non-Ferrous Pyrometallurgy: Trace Metals, Furnace Practices and Energy Efficiency, 31$^{st}$ Conference of Metallurgists of the Metallurgical Society of CIM, Edmonton, AB, Canada, 1992 pp. 337-351.

* cited by examiner

SYSTEM AND METHOD FOR CONTROLLING POWER ACROSS MULTIPLE ELECTRODES IN A FURNACE

CROSS REFERENCE TO RELATED APPLICATIONS

This application claims the benefit of U.S. Provisional Patent Application Ser. No. 60/606,342, filed Sep. 1, 2004 and entitled "Power Control System for Multiple Electrical Loads", the entire contents of which is hereby incorporated by reference.

FIELD OF THE INVENTION

The present invention relates generally to systems and methods for stabilizing the power and/or current consumption of multiple loads and/or balancing the three-phase current of three-phase loads, where the loads draw energy from the same source.

BACKGROUND OF THE INVENTION

There are certain contexts in which power or current control and current unbalance compensation are desirable to mitigate the inefficiencies and potential damage that can result from fluctuating power or current demands and unbalances. For example, in the case of alternating current (AC) Electric Arc Furnace (EAF) loads, electric arcs are created among a number of electrodes and the material in the furnace in order to heat, melt or smelt metals, ore or other materials. These arcs behave as time varying and mostly resistive impedances. Variations in arc resistance cause related variations in the power and current drawn by the furnace. The relationships between arc resistance, power and current are shown graphically in FIG. 1A.

In FIG. 1A, Curve A shows variations in arc resistance from low values (a short circuit) to high values (a loss of arc). An exemplary operating resistance and current point is marked with a dot on Curve A. Curve B of FIG. 1A shows the power drawn by the arc versus the arc current for the corresponding arc resistance variations. An exemplary power and current operating point is also marked with a dot on Curve B. The power or current fluctuations resulting from arc resistance variations affect the power supply system and cause frequency and voltage disturbances, which may negatively impact the operation of the power supply, and other furnace loads connected to the same power supply. For example, a sudden and large power upswing in the arc furnace may trigger a load shedding relay or a generator under-frequency relay to trip, resulting in a total loss of power to the arc furnace and leading to potentially substantial economic loss from the loss of productivity. Additionally, the voltage fluctuations at certain frequencies may cause light flicker.

Another problem also arises when an AC EAF is connected as a three-phase load to a three-phase power supply. As the arc resistances in the furnace may not always be equal amongst the three phases, the current may be unbalanced between the phases. Unbalanced currents can in turn cause voltage unbalances, which can affect the operation of other loads, such as electric motors, for example, connected to the same power supply. If the current unbalance exceeds the unbalanced current limit of the supply system generators, the unbalance may cause relays within the power system to trip, resulting in a loss of power to the furnace.

Traditionally, EAF operations have been controlled by electrode positioning systems to operate at a desired setpoint of power, current or impedance. The electrode positioning systems generally rely on moving mechanical parts and typically lack the speed and flexibility to respond adequately to fast resistance changes.

To reduce the amount of resistance fluctuations, one or more series reactors may be added to the furnace power supply. The series reactors force the EAF to operate at a lower power factor and therefore allow more stable arcing. However, the reactors alone may be inadequate to obtain the desired level of power stability. Additionally, reactors alone are not an effective means of current unbalance reduction. This is because their reactance values may not change as quickly as the speed at which the arc resistance changes.

Some attempts have been made to temper the effect of power fluctuations in electric arc furnace installations. For example, U.S. Pat. No. 6,603,795 to Ma et al., the entire contents of which is hereby incorporated by reference, describes a system for stabilizing the power consumption in an electric arc furnace by using variable reactor control and electrode height regulation to reduce active power fluctuations. The system monitors the operating characteristics of the furnace, such as the electrode impedance, and makes corresponding adjustments to the variable reactance. The reactance in the circuit may be controlled by adjusting the firing angle of a set of thyristors that couple a reactor to the circuit.

FIG. 2 shows a diagram of a simplified circuit 10 of an electric arc furnace in accordance with Ma et al. The circuit 10 shows a line voltage 12, arc impedance 14, a fixed circuit reactance 16, and a variable reactance 18. The arc impedance 14 includes an arc reactance $X_{arc}$ and an arc resistance $R_{arc}$. The fixed circuit reactance 16 may include the reactance of the furnace transformer and any power cables, conductors, and bus work between the supply system and the electrode, where that reactance can be considered constant as compared to the arc impedance 14.

The power control system described in Ma et al. varies the reactive impedance of the electrodes of an electric arc furnace and the power supply line in response to measured characteristics of the furnace. The system monitors the voltage and current drawn by an electrode in the electrode arc furnace and determines the electrode impedance. Based upon the electrode impedance, the power control system adjusts the reactive impedance to minimize power consumption fluctuations of the arc furnace, as seen by the power supply. It does this by adjusting a variable reactance. The response time associated with this control system is in the order of about one electrical cycle, providing for a relatively fast response.

Ma et al. also describe an electrode position controller that controls an electrode positioning system to adjust the electrode height based upon measured characteristics of the electrode. For example, the electrode position controller may monitor the electrode impedance by monitoring the voltage and current characteristics for the furnace and may regulate the electrode height to minimize power fluctuations due to changes in the electrode impedance. The response time of this control system is relatively slow, being in the order of several seconds.

The system described in U.S. Pat. No. 6,603,795 to Ma et al. is generally able to minimize the power swings and maintain a desired set point for a single furnace. However, the system has a limited capacity to minimize larger phase or electrode power dips under a particular threshold. Moreover, the system is not designed to minimize load unbalances amongst three electrical phases.

FIG. 1B illustrates the limitation of the system described in U.S. Pat. No. 6,603,795 to Ma et al. in minimizing larger phase or electrode power dips under a particular threshold. Curve C in FIG. 1B shows the required variable reactance in order to compensate for the variation in the load resistance in meeting the specific power set-point. Curve D shows the amount of variable reactance that is obtained, taking into account the practical size limits of the variable reactor. The required reactance and current at the desired operating points are also marked. Curve E shows the power drawn by the arc furnace versus the current drawn for the corresponding arc resistance variations when the variable reactance of Curve C is inserted in the circuit. The resulting operating point power and current are also marked.

As illustrated in FIG. 1B, if the electrode current I drops below a critical value $I_{critical}$ (for example, when the arc is extinguished under one electrode), the circuit 10 will be unable to maintain the power at a fixed level and the power will drop below the power set point. The critical value $I_{critical}$ coincides with the variable reactance 18 being reduced to its minimum value. There may also be a maximum variable reactance setting that limits the ability of the circuit 10 to maintain the power at the set point if the current rises above a maximum current value, $I_{max}$.

Another difficulty arises with 3-electrode furnaces connected to a 3-phase supply. In such a configuration, the sum of the instantaneous values of the electrode currents has to be zero at any given time. Therefore, a change of arc impedance or variable reactance in one phase causes a change in current, not only in the phase experiencing the impedance change, but also in all remaining phases.

In some instances, the furnace geometry and feed material distribution is not quite symmetrical. Therefore, even with stable furnace power, the heat distribution in the furnace may be uneven. As a result, the temperature profile inside the furnace or around the furnace sidewalls may become unsymmetrical, leading to undesirable relatively hot or cold spots.

It is desired to address or ameliorate one or more of the shortcomings or disadvantages associated with previous control systems and methods for controlling power and/or current in electrical furnaces, or to at least provide a useful alternative thereto.

SUMMARY OF THE INVENTION

Aspects of the invention relate generally to power and/or current conditioning in controlling multi-phase electric furnaces or other loads. Certain aspects relate to systems and methods for controlling unbalance or maintaining set-points in a furnace. The power and/or current demands of the furnace may be compensated to mitigate the effects of fluctuating or unbalanced load currents upon the power supply system. According to some aspects, all phase reactances are updated in response to a change in only one operating characteristic. Other aspects achieve unequal set-points among the phases, thereby allowing compensation for uneven feed material or furnace geometry.

In one aspect, the invention relates to a control system for controlling a multi-phase electric furnace coupled to a multi-phase power supply. The control system comprises a variable reactor coupled between each phase of the multi-phase electric furnace and the respective phase of the multi-phase power supply. The control system also comprises monitoring means and control means. The monitoring means is coupled to each variable reactor for monitoring an operating characteristic of each phase of the electric furnace and for determining whether the operating characteristic of at least one phase deviates from a respective set-point. The control means is coupled to each variable reactor and the monitoring means and sets a value of each variable reactor according to the set-point of the phase to which it is coupled. The control means is configured to set the value of each variable reactor to achieve a respective set-point based on the operating characteristic on all phases in response to determination by the monitoring means that the operating characteristic of at least one phase deviates from the respective set-point.

In a further aspect, the invention relates to a method of controlling a multi-phase electric furnace, each phase being coupled to a multi-phase supply through an associated variable reactor and having a set-point. The method comprises the steps of: monitoring an operating characteristic and a value of the variable reactor for each phase; determining that the operating characteristic of at least one of the phases deviates from the respective set-point; and adjusting the values of the variable reactors when it is determined that the operating characteristic deviates from the set-point, based on the operating characteristics of all phases.

In a further aspect, the invention relates to a control system for controlling unbalance of a multi-phase electric furnace, each phase being coupled to a power supply. The control system comprising a variable reactor associated with each of the phases, each variable reactor being coupled between its associated load and the power supply The control system also comprises control means coupled to each variable reactor. The control means including an unbalance determination component for monitoring an operating characteristic of each phase and for determining an unbalance value for the multi-phase electric furnace, and a reactance adjustment component responsive to the unbalance determination component for controlling the variable reactors based upon the operating characteristics on all phases to maintain a predetermined degree of unbalance.

In a further aspect, the invention relates to a method of controlling a multi-phase electric furnace, each phase being coupled to a power supply through an associated variable reactor. The method comprises the steps of: monitoring an operating characteristic of each phase; determining an unbalance value for the multi-phase electric furnace load; and controlling the variable reactors based on the unbalance value and the operating characteristics on all phases to maintain a predetermined degree of unbalance.

In a further aspect, the invention relates to a control system for controlling unbalance in one or more three-phase loads, the three-phase loads being coupled to a three-phase power supply. The control system comprises a variable reactor associated with each phase, a variable reactance control system associated with each variable reactor and a central control system coupled to each variable reactance control system. Each variable reactor is coupled between the three-phase load and an associated phase of the power supply. The variable reactance control system monitors an operating characteristic of its associated phase and sets a value of the respective variable reactor in response to the operating characteristic so as to maintain a set-point. The central control system includes a detection component and an override component. The detection component measures an unbalance value for the three-phase load and determines whether the value of the variable reactor has reached a threshold value. The override component is responsive to the detection component for outputting a control signal to the variable reactance control systems. The variable reactance control systems each include an interface for receiving the control signal, in response to which the variable reactance control systems adjust the variable reactors.

In a further aspect, the invention relates to a method for controlling unbalance in one or more three-phase loads, each three-phase load being coupled to a three-phase power supply. Each phase is coupled to the three-phase load through an associated variable reactor and each associated variable reactor is coupled to a corresponding variable reactance control system for monitoring an operating characteristic of the phase and for setting a value of the variable reactor in response to the operating characteristic so as to maintain a set-point. A central control system is coupled to the variable reactance control systems. The method comprises the steps of: at the central control system, calculating an unbalance value for the three-phase load; determining whether the unbalance value exceeds a predetermined threshold; outputting a control signal from the central control system to the variable reactance control systems if the unbalance value exceeds the threshold; and on at least one of the phases, adjusting the associated variable reactor in response to the control signal to reduce the unbalance value below the threshold.

In another aspect, the invention relates to a control system for controlling a multi-phase electric furnace, each phase being coupled to a power supply. The control system comprises a variable reactor associated with each of the phases and control means coupled to each variable reactor. Each variable reactor is coupled between its associated load and the power supply. The control means comprises a monitoring component for monitoring an operating characteristic of each phase, and a reactance adjustment component responsive to the monitoring component for controlling the variable reactors based upon the operating characteristics on all phases to maintain a predetermined set-point on each phase.

In another aspect, the invention relates to a method of controlling a multi-phase electric furnace, each phase being coupled to a power supply through an associated variable reactor, the method comprising the steps of: monitoring an operating characteristic of each phase; and controlling the variable reactors based on the operating characteristics on all phases to maintain a set-point on each phase.

BRIEF DESCRIPTION OF THE DRAWINGS

Reference will now be made, by way of example, to the accompanying drawings, which show embodiments of the present invention, and in which.

DETAILED DESCRIPTION OF EMBODIMENTS OF THE INVENTION

While the embodiments are described by way of specific example in relation to electric arc furnaces, the invention is not limited in application to electric arc furnaces. Embodiments of the present invention may be applicable to any other type of electrical load, including non-arcing electrodes, with a fluctuating active or reactive power or current demand or any other type of 3-phase unbalanced loads, including those with a 3 or 4 wire supply.

While the embodiments described herein generally relate to three phase, three-wire electric arc furnaces with one electrode per phase, it should be understood that the invention is applicable to furnaces having only one electrode, whether arcing or non-arcing and whether DC or AC, or other numbers of electrodes. In particular, the invention may be applied to furnaces having two electrodes per phase of a multi-phase power supply. For example, the invention may be applied to a three-phase furnace having six electrodes.

It should be understood that for every kind of electrical furnace configuration, it is necessary to provide a return path for the current passing through the electrode. This may be through the conductors of the three-phase power supply or it may be through a dedicated conductor separate to the supply conductors. In the case of a one electrode furnace, the return path of the current may be through a fixed conductive medium in electrical contact with the matte or molten metal.

Figure 1A:
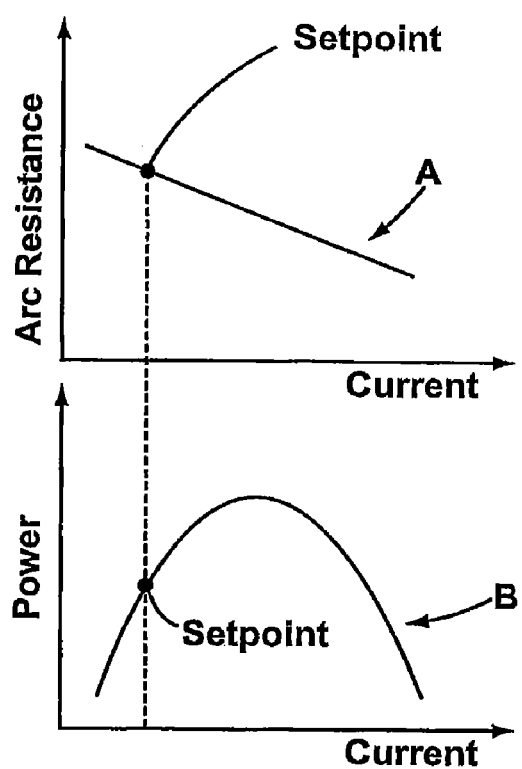
FIG. 1A shows example graphs illustrating the relationship between arc resistance, current and power of an arcing electrode in an arc furnace.
Figure 1B:
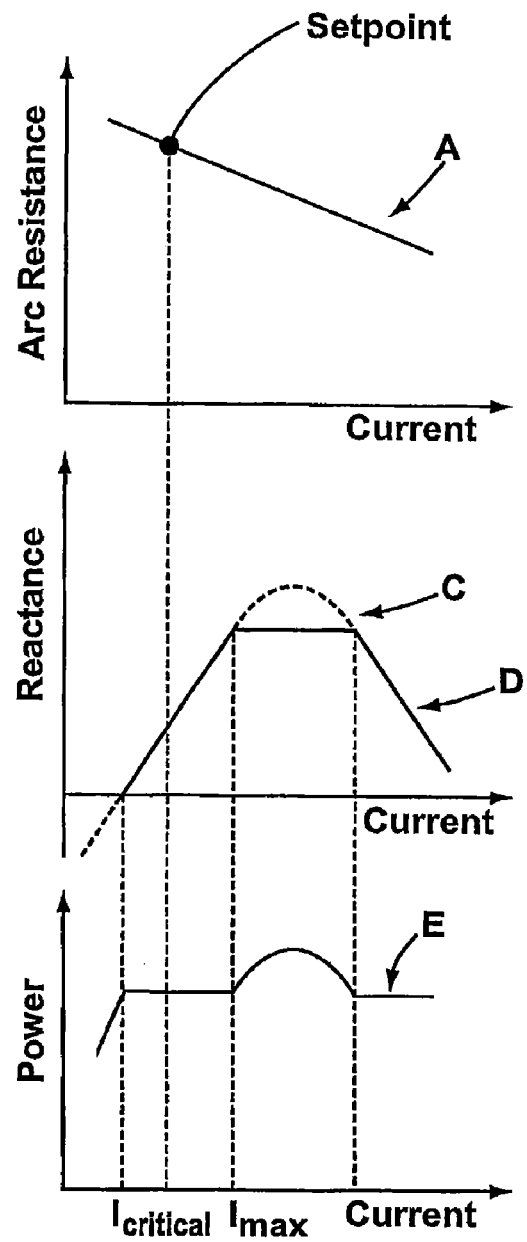
FIG. 1B show example graphs illustrating the relationships between arc resistance, current, reactance and power of an arcing electrode in an arc furnace using a variable reactor coupled to the electrodes.
Figure 2:
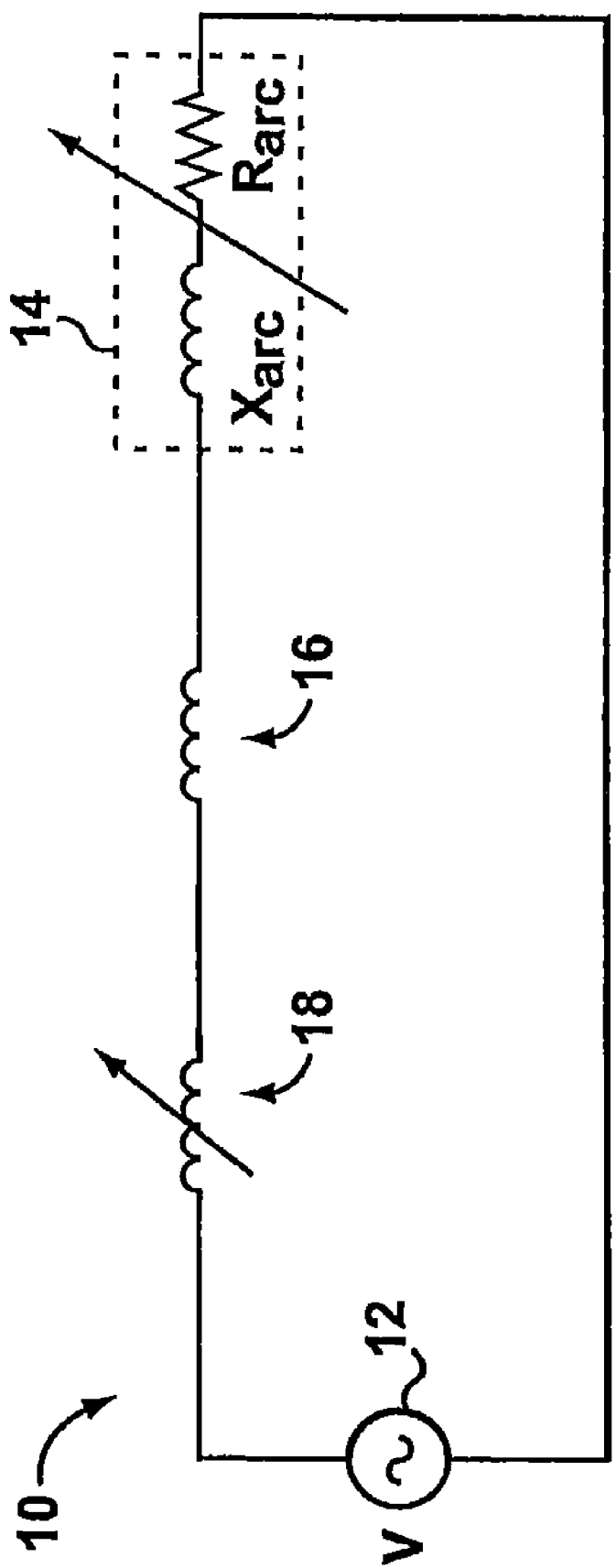
FIG. 2 shows a per-phase diagram of a simplified circuit of an electric arc furnace.
Figure 3:
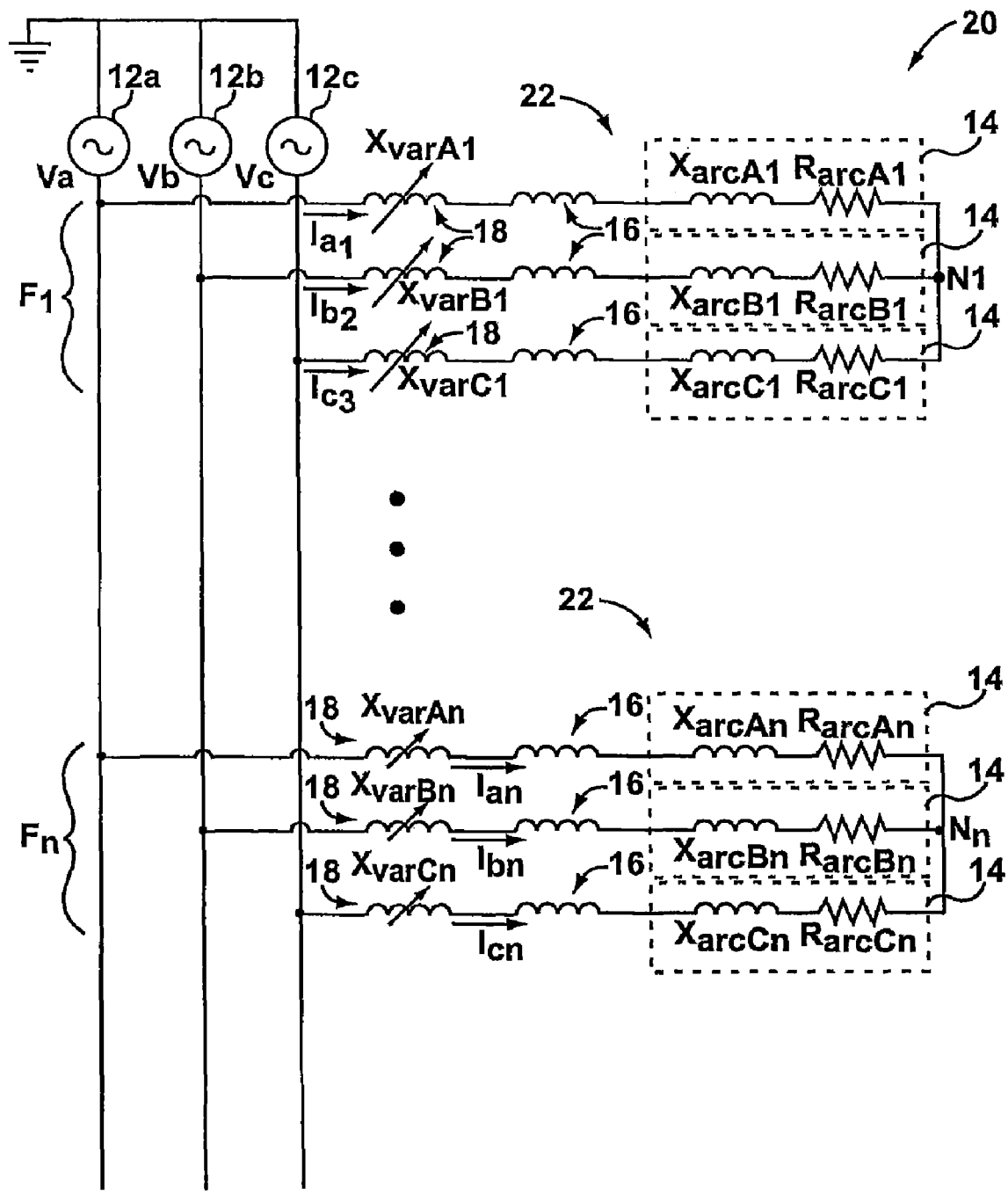
FIG. 3 shows a diagram of a simplified circuit of multiple electric arc furnaces supplied by a 3-phase 3 wire power system.

This difficulty in maintaining the power set-point described in relation to FIG. 1 also arises in the context of three-phase loads, as will be explained with reference to FIG. 3. FIG. 3 shows a simplified circuit 20 for multiple electric arc furnaces 22 (having respective power supply circuits $F_1, F_2, \ldots, F_n$). The line voltage is shown in three phases 12a, 12b, 12c. Each furnace includes three electric arc electrodes, A, B, and C (not shown)—one for each phase.

Each phase of each power supply circuit for the electric arc furnace includes a variable reactance 18 (shown individually as $X_{varA1}, X_{varB1}, X_{varC1}$) and a fixed circuit reactance 16. Each phase also includes the arc impedance 14, which is made up of the arc reactance ($X_{arcA1}, X_{arcB1}, X_{arcC1}$) and the arc resistance ($R_{arcA1}, R_{arcB1}, R_{arcC1}$) joined at a common neutral point N. Since, in general, the source voltages, arc impedances 14 and variable reactances 18 are not balanced among phases, the neutral point N is not necessarily at ground potential.

Arc impedance varies with time. For each furnace, variable reactance control system has two goals: the first is to maintain the furnace power as close as possible to a set point value despite arc impedance variations; the second is to minimize the furnace current unbalance despite arc impedance variations. Variations in one of the arc impedances cause corresponding changes in all three currents $I_{a1}$, $I_{b1}$, $I_{c1}$, and in furnace power. The change in arc impedance usually occurs on one or two of the phases, rather than all three together. Therefore, the variable reactance 18 for each of the phases should be adjusted to compensate for the change in power in order to adjust the power and maintain the power set point. However, there will be a limit to the extent to which this corrective action is effective and this limit corresponds to the adjustable range of the variable reactances 18 (as illustrated by curve D in FIG. 1B). For example, the power set-point may not be maintained in the case of extinguishment of one arc, as there is a limit on how much variable reactances on each phase can be decreased to compensate for the loss of arc. Accordingly, this tends to cause unbalance amongst the phases of an arc furnace.

To an extent, the unbalance within a furnace due to variations in the arc impedance 14 of a phase may be compensated by adjusting the variable reactances 18 for each of the phases. Moreover, the goal of maintaining the power set-point may be in conflict with the goal of maintaining phase balance. For example, fully balancing the phases in the case of extinguishment of one arc may involve reducing the current of the other phases to zero, which would result in an undesirable total power drop to zero.

The above examples highlight the need for two additional goals when more than one furnace is supplied from a common power supply as shown in FIG. 3: to maintain the overall power drawn by all furnaces as close as possible to a set-point despite the variable reactance limits of each furnace; and to minimize the overall unbalance in current drawn by the furnaces, despite the variable reactance limits of each furnace.

In the case of active power stabilization and unbalance compensation of 3-phase 3-wire loads, these four goals or control objectives may be expressed using the following four formulas:

$$P_{3-\phi} = \text{Re}(\overline{V_a I_a^*}) + \text{Re}(\overline{V_b I_b^*}) + \text{Re}(\overline{V_c I_c^*}) = P_{sp} \quad (1)$$

for each 3-phase load $$|\overline{I_2}| = \text{min value for each multiphase load} \quad (2)$$

$$\sum_{F_1}^{F_n} P_{3-\phi} = \sum_{F_1}^{F_n} [\text{Re}(\overline{V_a I_a^*}) + \text{Re}(\overline{V_b I_b^*}) + \text{Re}(\overline{V_c I_c^*})] = P_{totalsp} \quad (3)$$

$$\left| \sum_{F_1}^{F_n} \overline{I_2} \right| = \text{min value} \quad (4)$$

where $(\overline{I_a})+(\overline{I_b})+(\overline{I_c})=0$ and $\overline{I_2}$ is the negative sequence current. The negative sequence current is a measure of current unbalance given by the following decomposition equation:

$$\overline{I_2} = \frac{1}{3}(\overline{I_a} + a^2 \overline{I_b} + a \overline{I_c})$$

$$(5)$$

where $a=-0.5+j0.866$, $I_2$ is the negative sequence current, $I_a$ is the phase A current vector, $I_b$ is the phase B current vector, and $I_c$ is the phase C current vector.

In one embodiment, the present invention applies the above four control objective equations in a priority order as given above—i.e. the first two objectives are to maintain the power set-point for an individual furnace (Equation 1) and to minimize the power unbalance within the individual furnace (Equation 2); and if these two conditions cannot be met by making adjustments to the variable reactances 18 within the individual furnace, then adjustments are made to the variable reactances 18 within other furnaces in order to meet the third and fourth conditions (Equations 3 and 4). The third condition is that, irrespective of whether the individual furnace power set-points $P_{sp}$ are met, the overall summed power should meet the total power set-point $P_{totalsp}$. The fourth condition is that, irrespective of the state of current unbalance $|I_2|$ within an individual furnace, the total overall unbalance for all furnaces combined should be minimized.

The foregoing conditions are not all necessary conditions. Some embodiments may only include some of these conditions. In addition, the conditions may be in a different order of priority. For example, in one embodiment, the goal of minimizing overall unbalance (Equation 4) may take precedence over the goal of maintaining the total power set-point (Equation 3). Furthermore, the priority level of these conditions may change with time. This is because the negative effects of unbalances on the power system are mostly heat-related and increase with time. However, the adverse effects of power changes relate to the speed of the power change, and tend to be the greatest immediately after a sudden power change. Therefore, maintaining the total active power set-point may have a higher priority immediately after a large load change in order to minimize the impact on the frequency of the power supply. However, for a sustained load change, minimizing overall unbalance becomes more important.

Although the foregoing expressions relate to maintaining the real (active) power set-point for each load, they may be applied to maintaining other power set-points. For example, they may be applied to a system for maintaining an imaginary (reactive) power set-point, an apparent power set-point, or a combination of powers like a power factor set-point.

The references herein to power stabilization, power set-points, and power measurements may equally apply to current stabilization, current set-points, and current measurements. In other words, the control system 100 may provide for current stabilization in the same manner that it provides for power stabilization.

In some embodiments, the current unbalance compensation may have a goal or condition of maintaining a predetermined level of unbalance current rather than minimizing or eliminating unbalance current.

In some embodiments, loads associated with different phases may purposely have different power and/or current set-points, meaning that the overall system has a certain controlled level of unbalance. Such unbalance may, for example, be desirable in a furnace to provide more power and/or current to the electrode nearest the tap hole of the furnace. This facilitates local heating of the bath in the tap hole area and, consequently, local reduction in the bath viscosity and an improved ability to tap the liquid material from the furnace.

Figure 4:
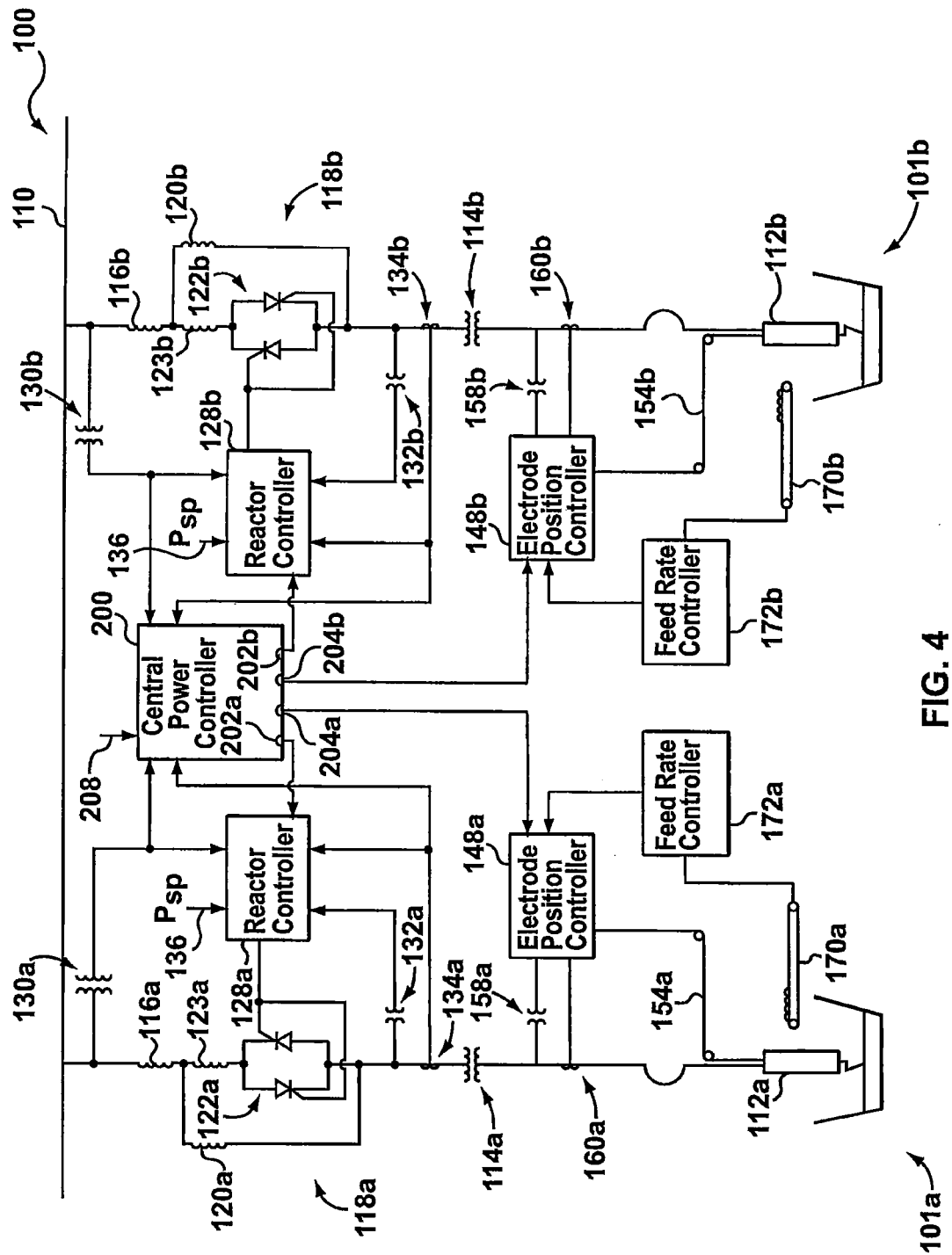
FIG. 4 shows a per phase block diagram of a power control system in accordance with an embodiment of the invention.

Reference is now made to FIG. 4, which shows a block diagram of a power control system 100 in accordance with one embodiment of the present invention. The power control system 100 includes two furnaces (loads), 101a and 101b. Only a single-phase embodiment is illustrated in the diagram for the sake of simplicity of description; however, those of ordinary skill in the art will appreciate that the functions and operating principles of the single-phase control described and illustrated may be extended to multi-phase systems. Additionally, the power control system may be used to control power to more than two For ease of reference in this description, where a reference is made to parts or functions indicated by reference numerals having both—a and—b suffixes, the suffixes may be omitted. For example, "furnace 101" will be used to indicate a reference to furnaces 101a and 101b, unless otherwise indicated.

Each furnace 101 (each phase in the case of a three-phase embodiment) includes an electrode 112 coupled to the secondary side of a furnace transformer 114. The primary side of the furnace transformer 114 is coupled to a supply bus power source 110 through a fixed circuit reactance 116 and a variable reactor 118. Variable reactor 118 may alternatively be placed on the secondary side of transformer 114.

In one embodiment, the variable reactor 118 includes an inductor 120 connected in parallel with a series combination of an inductor 123 and a thyristor switch 122. Each thyristor switch 122 includes a pair of thyristors arranged in opposite polarity to each other.

Each furnace (or phase) includes a variable reactor control system, which includes a first voltage transformer 130 for measuring the voltage on the supply side of the variable reactor 118, a second transformer 132 for measuring the voltage on the furnace side of the variable reactor 118, a current transformer 134 for measuring the main current flowing to the furnace transformer 114, and a reactor controller 128.

The reactor controller 128 receives information from the first and second voltage transformers 130, 132, the current transformer 134, and a desired power set-point input 136. The reactor controller 128 controls the variable reactor 118 based upon calculations performed using such information.

The reactor controller 128 may comprise a programmable device, such as a digital signal processor, a microcontroller, a microprocessor, a personal computer, or an application specific integrated circuit (ASIC). The reactor controller 128 may operate under stored program control comprising computer program instructions, the stored program control implementing the functions and operations described herein and being stored in a memory element, such as firmware. The suitable programming of the reactor controller 128 to implement the functions or operations described herein will be within the understanding of one of ordinary skill in the art. Those of ordinary skill in the art will also appreciate that the reactor controller 128 may be implemented using other combinations of hardware and/or software.

The reactor controller 128 controls the reactance of the variable reactor 118 by adjusting the firing angles of thyristors 122, thereby increasing or decreasing the current through the inductor 123. Based on ongoing current and voltage readings acquired from the first and second voltage transformers 130, 132, and the current transformer 134, the reactor controller 128 gates the thyristors 122 to vary reactance in order to regulate power swings or unbalances in the arc furnace 101 (about the desired power set-point 136) that result from arc impedance fluctuations.

Each furnace 101 (or phase) may further include an electrode position controller 148 that receives inputs from a voltage transformer 158 and a current transformer 160 on the secondary side of the furnace transformer 114. The electrode position controller 148 is operatively coupled to an electrode movement system 154 for adjusting the height of the electrodes 112, and thus, the arc impedance. The electrode position controller 148 may therefore adjust the height of the electrodes 112 in order to compensate for changes in the arc impedance. The response time of the electrode positioning system is typically at least one order of magnitude slower than the variable reactance system.

A batch feed system 170 is coupled to each furnace 101 to supply new material to the furnace 101 to counter the removal of processed material from the furnace 101. Each batch feed system 170 is controlled by a feed rate controller 172. The feed rate controller 172 regulates the supply of new material and has an output coupled to the electrode position controller 148 through which it provides the electrode position controller 148 with a data signal corresponding to the feed rate of new material. The electrode position controller 148 uses this data signal to anticipate changes to the arc impedance or to compensate for changes in the arc impedance. For example, in anticipation of the introduction of new material to one of the furnaces 101a, the electrode position controller 148a may initiate lowering of the electrode 112a.

The reactor controller 128a maintains the furnace power set-point level, despite the lowering of the electrode 112a and the consequent reduction in the arc impedance, by increasing the reactance of the variable reactor 118a and thus preventing the power from exceeding the power set-point. The anticipating action of the electrode position controller 148 positions the electrodes 112a at such a height as to mitigate against new material entering the furnace breaking the arc path. At the same time, the reactor controller 128 maintains the furnace power set-point through adjustments to the variable reactor 118.

Upon completion of the feeding of new material into the furnace, the electrode 112 is raised toward its previous position by the electrode position controller 148 and consequent adjustments are made by the reactor controller 128 to ensure the furnace power set-point is maintained during movement of the electrode 112.

Figure 13:
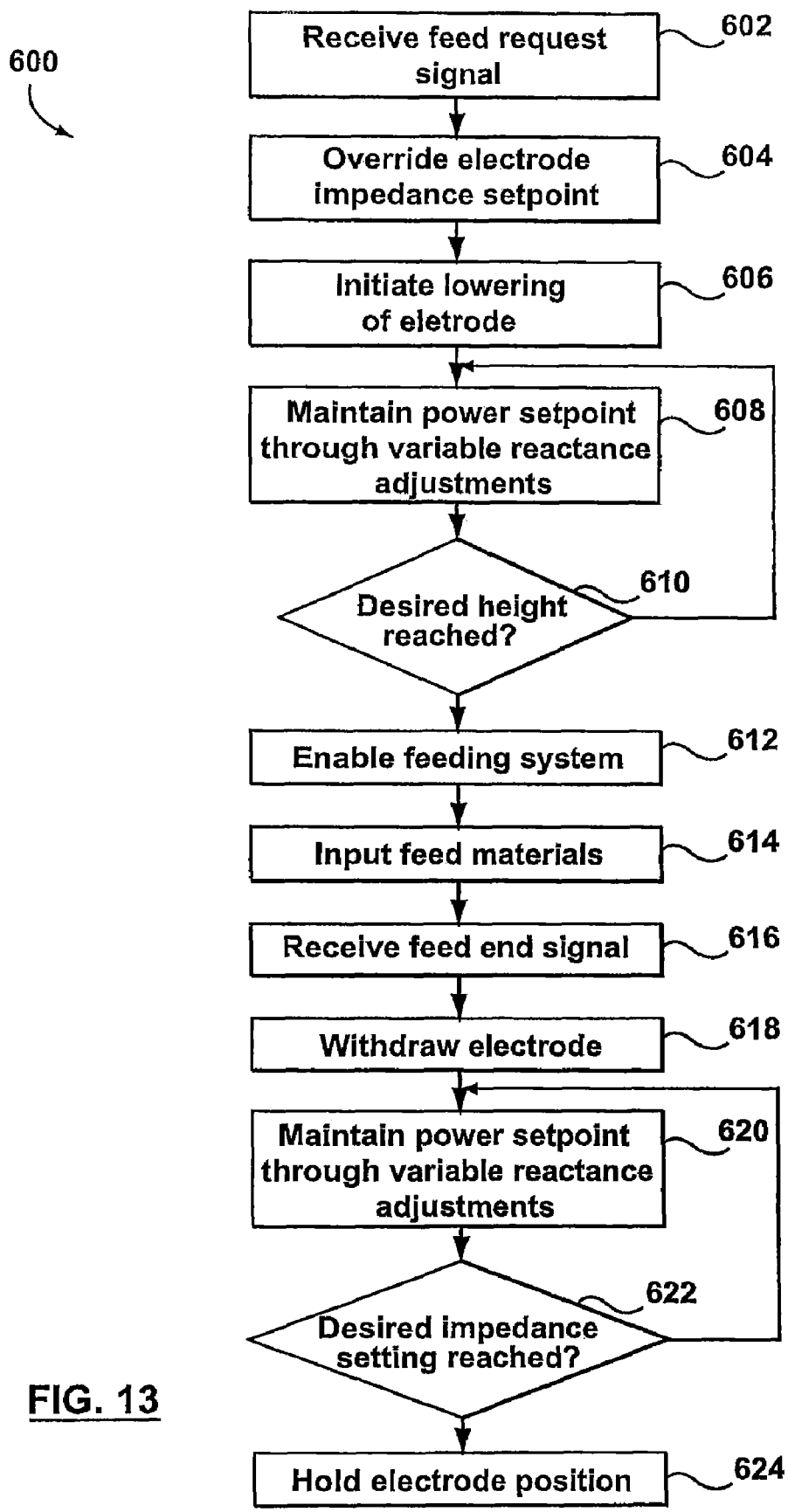
FIG. 13 shows, in flowchart form, a method of regulating electrode position.

Referring also to FIG. 13, there is shown, in flowchart form, a method 600 of regulating electrode position. The method 600 begins in step 602, when the electrode position controller 148 receives a feed request signal from the feed rate controller 172 indicating that new material is to be input to the furnace 101. The feed request signal may result from a manual operator-initiated feed instruction, or may result from an automated feed instruction in the case of an automated feed control system. Once the electrode position controller 148 receives the feed request signal it overrides the electrode impedance setting in step 604 and initiates lowering of the electrode(s) 112 in step 606.

While the electrode(s) 112 is being lowered, in step 608 the reactor controller 128 maintains the power and/or current set-point through adjustments to the variable reactor 118. In step 610, the electrode position controller 148 determines whether or not the electrode 112 has reached the desired position. It may make this decision on the basis of electrode impedance and/or calculated arc length reaching a threshold value. The threshold value may correspond to a height wherein the electrode 112 is in direct contact with the slag bath, thereby minimizing the possibility that new material could break the arc path. It would typically take a few seconds for the electrode 112 to be lowered to such a level.

Once the electrode 112 has reached the desired height, then in step 612 the electrode position controller 148 sends an enable signal to the feed rate controller 172 to indicate that the feed rate controller 172 may now initiate the introduction of new feed material to the furnace. Accordingly, in step 614, the feed system 170 begins to introduce new material to the furnace 101.

The feed system 170 sends the electrode position controller a completion signal (not shown) in step 616 to indicate the end of the feed process. In response to this signal, in step 618 the electrode position controller begins to withdraw or raise the electrode. Again, while the height of the electrode 112 is being altered, the reactor controller 128 adjusts the value of the variable reactor 118 to maintain a power and/or current set-point in step 620. In step 622, the electrode position controller 148 determines whether or not the electrode 112 has reached the desired height. This determination may be based upon the electrode impedance, which may be compared with the electrode impedance set-point that was temporarily overridden in step 604. Once the electrode impedance (or arc length or other measure) reaches the appropriate set-point, then in step 624, the electrode position controller 148 holds the electrode position and returns to normal operation.

In the present embodiment, fluctuations in the arc impedance may be compensated through adjustment of the variable reactor 118, adjustment of the electrode position, or both. It will also be appreciated that the adjustment of the electrode position is a corrective action that typically requires more time than the adjustment of the variable reactor 118, which can occur with each half cycle of the supply voltage. Accordingly, the variable reactance control system (i.e. variable reactor 118 in combination with reactor controller 128) may respond more quickly to variations in arc impedance than the electrode positioning system, allowing the electrode positioning system time to react to the variations.

The methods and systems described herein may be implemented using variable reactance control systems, electrode positioning systems, or both, for the purpose of reacting to power and/or current fluctuations and/or controlling unbalances. Although the following embodiments refer to use of a variable reactance control system for power and/or current stabilization or unbalance compensation, the present invention is not limited to use of a variable reactance control system. Other embodiments may employ an electrode positioning system alone or in combination with a variable reactance control system.

Referring again to FIG. 4, the power control system 100 further includes a central controller 200. The central controller 200 is coupled to each furnace (or phase) to receive measurement data regarding the operating characteristics of each furnace. For example, in one embodiment, the central controller 200 is coupled to each reactor controller 128, and in particular to each current transformer 134 to receive current measurements for each furnace.

The central controller 200 includes further inputs coupled to each reactor controller 128 or specifically to each first voltage transformer 130 to receive a measurement of the voltage on the supply side of the variable reactor 118 for each furnace. In other words, the central controller 200 receives voltage and current measurements for each furnace (or phase). The central controller 200 may receive the voltage and current measurements through direct coupling with dedicated additional current and voltage transformers, the current and voltage transformers 134, 130 used in the variable reactance control circuit, or indirectly from one or more output ports of the reactor controller 128. It will be appreciated that there may be other arrangements by which the central controller 200 is provided with voltage and/or current measurements for each of the furnaces (or phases).

The operating characteristics monitored by the central controller 200 includes the setting or value of each variable reactor 118. This variable reactor setting is input to the central controller 200 from each reactor controller 128. For example, each reactor controller 128 outputs its calculated reactance setting to the central controller 200.

The central controller 200 further includes an input for receiving a total power set-point value 208. The total power set-point value 208 is calculated from the sum of the individual desired power set-point inputs 136 for each furnace. Preferably, the central controller 200 receives the individual power set-point values 136 from each of the reactor controllers 128 and calculates the total power set-point value 208 by summing the received values.

The central controller 200 may comprise a digital signal processor, a microprocessor, microcontroller, or other programmable device for executing a program stored in memory, e.g. firmware, to implement the functions described herein. It will be appreciated that the functions of the central controller 200 may be implemented using a number of different hardware and/or software configurations. The suitable programming of the central controller 200 will be within the knowledge of those of ordinary skill in the art having regard to the present description.

The central controller 200 regulates the overall operation of all of the furnaces (and power on each phase for each multi-phase furnace) in accordance with one or more of the conditions described above. Accordingly, the central controller 200 includes a first output port 202 coupled to each reactor controller 128. The central controller 200 outputs a first control signal through the first output port 202 thereby providing instructions to the reactor controller 128 for adjusting the variable reactor 118. In one embodiment, the central controller 200 also includes a second output port 204 coupled to the electrode position controller 148. The central controller 200 outputs a second control signal through the second output port 204, thereby providing instructions to the electrode position controller 148 for adjusting the electrode height. The first and second control signals may comprise a value calculated by the central controller 200 to satisfy one or more of the conditions. The value calculated by the central controller 200 will override the value calculated by the reactor controller 128 for governing its control of the corresponding variable reactor 118.

In one embodiment, the central controller 200 stabilizes the power consumption of multiple three-phase loads, so as to satisfy the first and/or third condition described above. The first condition (exemplified by Equation 1) requires that the sum of the power drawn by each electrode of a furnace should equal a power set-point value for that furnace. The third condition (exemplified by Equation 3) requires that the sum of the individual power consumption by all furnaces should equal the total power set-point value for the whole system.

The central controller 200 monitors the operating characteristics for each of the furnaces (or phases) and identifies whether a furnace (or phase) has been unable to compensate for a drop in power on an individual basis. For example, a given three-phase furnace, A, may experience a drop in three-phase power and may attempt to compensate using the variable reactors 118. The central controller 200 monitors the currents and the voltages and the setting of the variable reactors 118 in furnace A.

If the setting of the variable reactors 118 reach a minimum or a maximum value, and the power drawn by furnace A deviates from the furnace A power set-point $P_{spA}$ by more than a predetermined amount P, then the central controller 200 will act to compensate for the deviation. The central controller 200 calculates the extent to which the power drawn by furnace A falls short of (or becomes higher than) the desired power set-point $P_{spA}$, and instructs the remaining furnaces to increase or decrease their power draw by a certain amount to compensate for the power deviation in furnace A.

Similarly, for example, within a single three-phase furnace one phase may experience a drop or rise in power and the central controller 200 may attempt to compensate using the variable reactor 118 associated with that phase. If the variable reactor controller 128 for that phase is unable to compensate because the setting of variable reactor 118 reaches a maximum or minimum value and the power has not returned to its set-point, then the central controller 200 determines that the variable reactor controller 128 for that phase is unable to address the power change alone. Accordingly, the central controller 200 may determine the amount by which the remaining phases must increase or decrease their power draw to compensate for the shortfall or rise on one phase. It then issues control signals to instruct the variable reactor controllers 128 on the other phases to adjust their power consumption through adjusting their power set-points, and thus the reactance values of their variable reactors 118.

Figure 11:
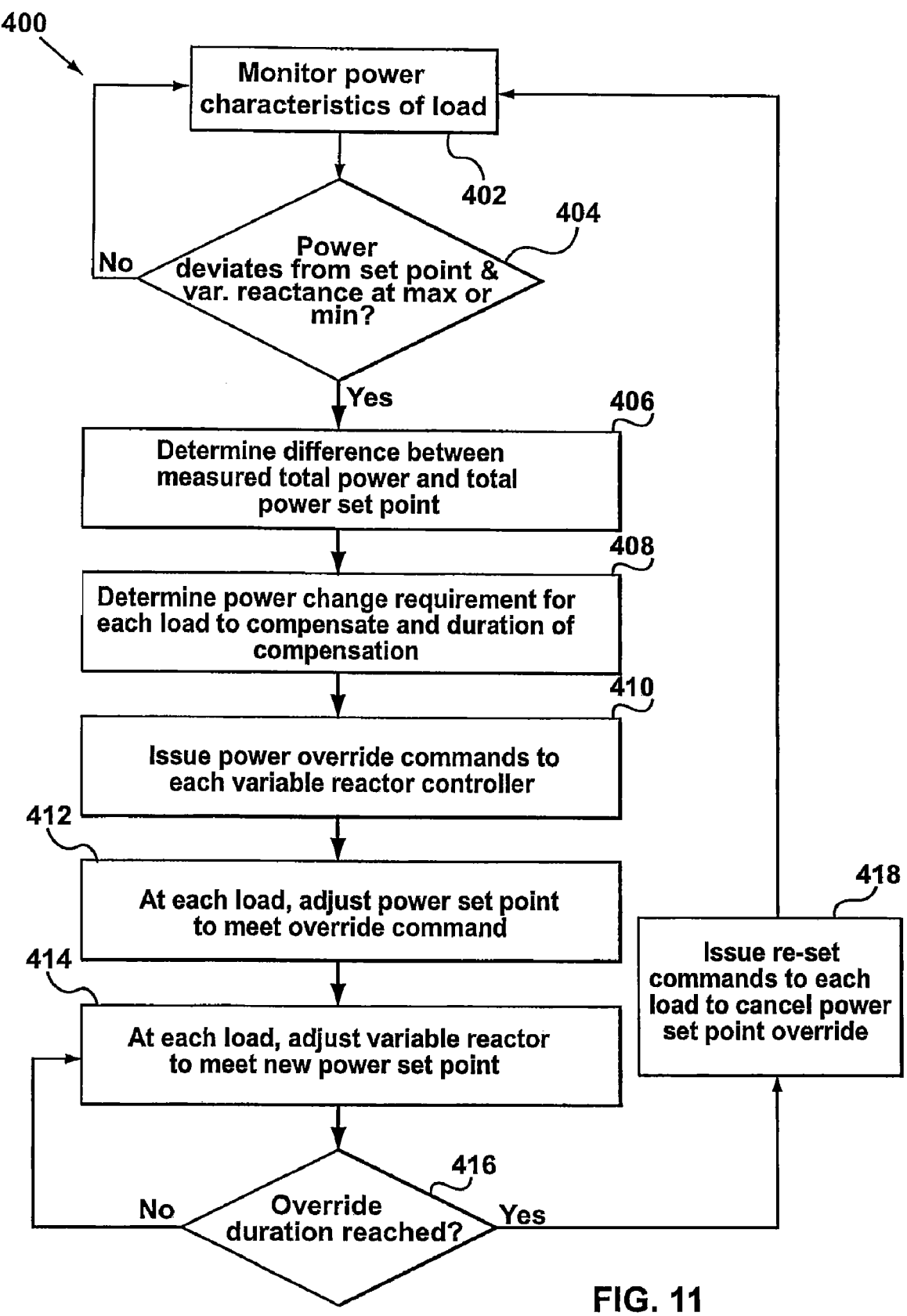
FIG. 11 shows, in flowchart form, a method of stabilizing the power drawn by multiple loads.

Referring also to FIG. 11, there is shown a flowchart of a method 400 of stabilizing the power consumption of at least two loads. The method 400 begins in step 402, wherein the central controller 200 monitors the operating characteristics of the electrical loads in the furnaces. In particular, the central controller 200 monitors whether or not the load is operating at the preset power set-point. It also monitors whether or not the value or setting of the variable reactor of each load has reached a maximum or minimum setting. In step 404, the central controller determines whether or not corrective action is required by assessing whether the power drawn by a load has deviated from a set-point. It also assesses whether the variable reactor associated with the load (or in the case of a three phase load, any one of the three variable reactors) has reached a maximum or minimum value. If these two conditions have occurred, then the central controller recognizes that compensation is required to stabilize the power consumption and the method continues to step 406. If these conditions do not exist, i.e. if the power drawn does not deviate from the set-point or the associated variable reactor has not reached a maximum or minimum value, then the method returns to step 402 to continue monitoring the situation.

It will be appreciated that the loads may be per phase loads within an individual three-phase furnace, or may be three-phase loads associated with multiple furnaces. In the latter case, the central controller may receive individual inputs for each phase within each furnace and may monitor variable reactors of each phase within each furnace.

In step 406, the central controller determines the extent to which it must take corrective action to maintain an overall total power set-point. It calculates the difference between the measured power drawn and the overall total power set-point. For example, if one of the loads has a power set-point of 70 MW and has dropped to an actual power draw of 50 MW, and two other loads are drawing power at the power set-point of 70 MW, then there is a 20 MW shortfall.

In step 408, the central controller determines the power change required within the other furnaces (other than the furnace experiencing difficulty) to compensate for the calculated difference. The central controller may employ a number of rules or algorithms to determine the extent to which other loads should compensate for a power shortfall. In some embodiments, the additional power draw required may be apportioned equally between the other furnaces. In other embodiments, more complicated rules may apply for determining the relative apportionment of the additional power draw required.

In one embodiment, the central controller may include a memory storing a look-up table. The look-up table may specify, for particular power shortfalls associated with particular loads, the corresponding power increases that the other loads are to implement. The central controller may further apply interpolation for values that fall between two entries in the look-up table. The look-up table values may be partly based upon the thermal short term capability curve of the power supply and the process for the particular furnace operating point.

Once the central controller 200 has determined the relative power increases required from the other loads to compensate for the power shortfall, then in step 410 it issues power override commands to the variable reactor controllers 128 associated with the other loads. It may, for example, send a control signal specifying a new load-specific power set-point. Alternatively, it may send a control signal specifying an increment by which the existing load-specific power set-point should be increased. The power override command may also include an override duration. The override duration may be a predetermined value stored at the central controller 200. The override duration may be dependent upon the situation and may be specified by the look-up table.

Each of the variable reactor controllers 128 associated with the other loads receives its power override command in step 412 and adjusts its load-specific power set-point accordingly. In step 414, the variable reactor controllers 128 react to the adjusted load-specific power set-point by determining a new value for their associated variable reactor 118. Accordingly, the values of the variable reactors are changed and the power drawn by each of the other loads is varied to meet the adjusted load-specific power set-points. The variable reactor controllers 128 maintain these adjusted load-specific power set-points until the override duration expires.

In step 416, the variable reactor controllers 128 determine whether or not the override duration has expired. If so, then in step 418 they re-set their load-specific power set-points to remove the override component and return to normal operation. The method 400 then returns to step 402, wherein the central controller 200 continues its monitoring function.

In an alternative embodiment, at step 418 the central controller 200 reassesses the power consumption of the loads and determines whether or not the problematic load has returned to normal operation, e.g. whether or not the power deficiency problem has been resolved. If so, then it cancels the override commands and returns to step 402. If not, then it may either extend the override period, modify the override commands in accordance with further instructions in the look-up table, or cancel the override and alert an operator to the problem.

In another alternative embodiment, the control system 100 does not feature individual variable reactance control systems 128 associated with each variable reactor 118. Rather, the central control system 200 directly controls each variable reactor 118. For example, a three-phase load may have a variable reactor 118 for each phase and the control system 100 may provide a central controller 200 coupled to each variable reactor 118 for monitoring operating characteristics of each phase and managing corresponding adjustments to each variable reactor 118. Such an embodiment may be implemented as a Y-configuration three-phase load, i.e. a load supplied via a 3-wire system with no neutral wire connection.

Different set-points may apply to each phase of the three-phase load, resulting in a predetermined level of unbalance. The interrelationship of the three loads leads to a system of equations that the central controller 200 solves in order to determine adjustments necessary to all three variable reactors in order to address deviations from one or more of the set-points. Changes in one variable reactor 118 affect the operating characteristics of all of the phases. To adjust the characteristics of a phase so as to address deviation from a set-point, adjustments are made to all of the variable reactors 118. The adjustment to each variable reactor is determined, taking into account the characteristics of all phases.

In addition to, or as an alternative to, implementing a power stabilization function, the central controller 200 may implement an unbalance compensation function. The second condition set out above (Equation 2) states that the unbalance within a three-phase load should be minimized. The fourth condition (Equation 4) states that the overall unbalance within a multiple three-phase load system should be minimized.

Referring again to FIG. 4, the central controller 200 monitors the extent of unbalance within one or more three-phase loads. In the case of a single furnace having a three-phase load, the central controller 200 determines the extent of unbalance within the three-phase load and provides corrective instructions to the variable reactor controllers 128 to minimize the unbalance. In the case of multiple furnaces each having three-phase loads, the central controller 200 determines whether the overall combination of the furnaces exhibits unbalance. It may assess whether the overall unbalance is due to a significant unbalance within one of the furnaces and whether that furnace is unable to compensate. It then provides corrective instructions to the remaining furnaces.

For example, in the case of a single furnace, the central controller 200 monitors the current in each phase and determines the negative sequence current $I_2$ for the furnace in accordance with Equation 5. If the calculation of negative sequence current $I_2$ indicates that the furnace is unbalanced, then the central controller 200 may determine corrective action to minimize the unbalance. For example, it may conclude that the unbalance results from a low current measurement in one of the phases and it may correct the unbalance by lowering the current in the other two phases. This would result in reduced power draw and would need to be evaluated against the goal of maintaining a power set-point. The central controller 200 may include a memory storing logic rules or a look-up table for resolving the appropriate corrective action for a given situation.

To compensate for an unbalance situation, the central controller 200 outputs command signals to the variable reactor controllers 128 and, in response, the variable reactor controllers 128 adjust the reactances of their associated variable reactors 118. As described above, in one embodiment, the command signals may comprise an override power set-point to be used in place of the normal power set-point for the load. In another embodiment, the command signal may comprise an incremental power set-point increase or decrease. Other command signals may be used instead of a set-point override signal, including specifying a current set-point or a variable reactor value or setting.

Figure 5:
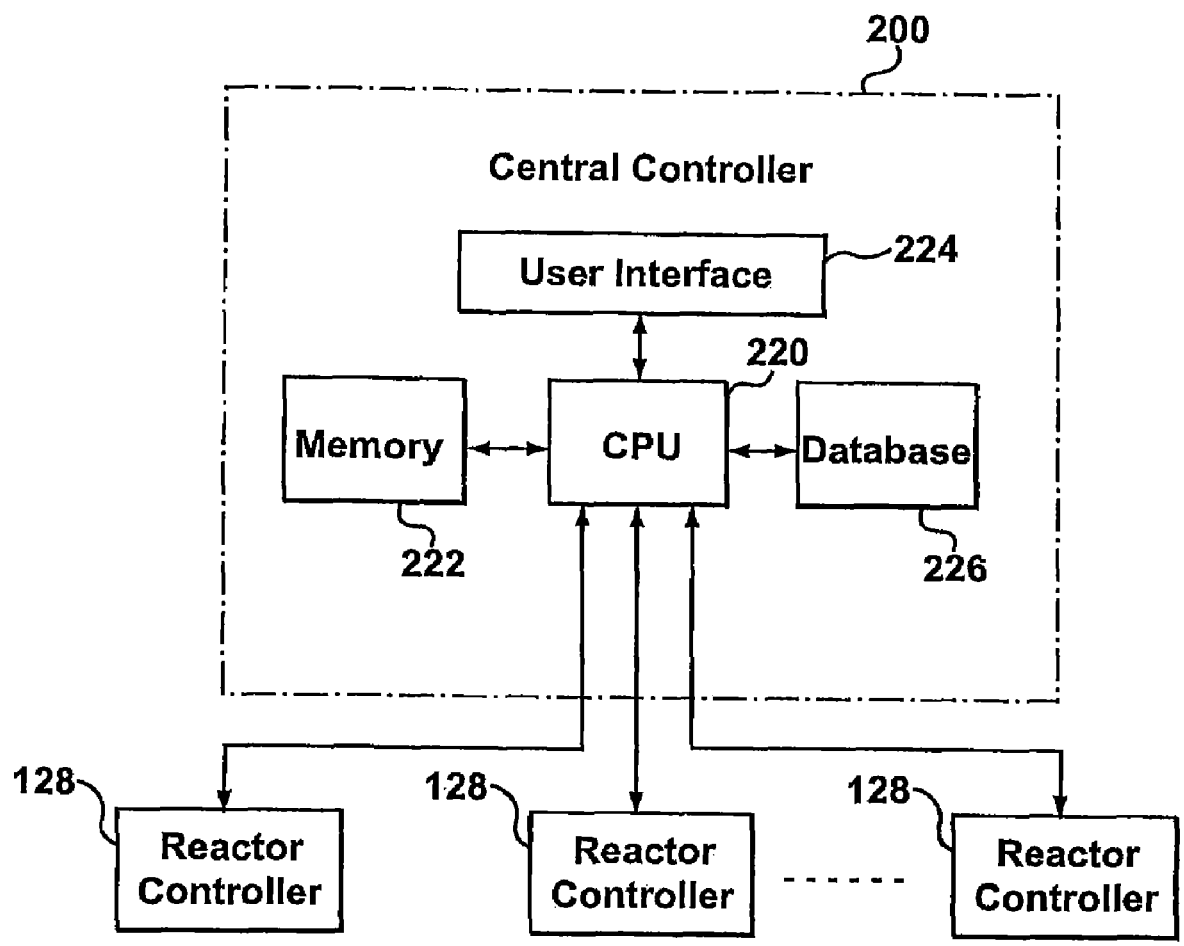
FIG. 5 is a block diagram of part of a control system for one or more furnaces, according to an embodiment of the invention.

Referring also to FIG. 5, central controller 200 is described in further detail. The function of central controller 200 is to monitor and control the variable reactors 118 and electrode position controllers 148 to ensure that each phase within each furnace and each furnace itself is operating at its set-point. To this end, the central controller 200 communicates with the variable reactor controllers 128, either directly or via an intermediate controller (as described below) to cause adjustments in the reactance values of the variable reactors 118.

Central controller 200, which may also be termed a compensation controller or overall controller because of its monitoring and compensation functions, comprises a computer processor 220, which may comprise a single central processing unit (CPU) or multiple processors. Computer processor 220 executes computer program instructions in the form of software modules programmed to facilitate the monitoring and control functions described herein. The computer program instructions executed by computer processor 220 are stored in memory 222 and accessed by computer processor 220 as necessary. Central controller 200 further comprises a database memory 226 accessible by the computer processor 220 for storing look-up tables containing reactance values and/or thyristor gating angle values corresponding to particular set-points. Database 226 may also contain historical and analytical data received by central controller 200 during operation of its monitoring and control functions.

Central controller 200 further comprises, or has associated therewith, a user interface 224 for allowing a furnace operator to interface with the central controller 200. User interface 224 may be any form of standard user interface equipment, including, for example, one or more displays, a keyboard and a cursor positioning device, such as a mouse. Further, user interface 224 may comprise a network connection for distributed interfacing to central controller 220 from a number of computer terminals connected to the network.

In the case of multiple furnaces, the central controller 200 may monitor the overall power or current unbalance of the multiple three-phase loads and the setting of the positioning systems and variable reactors 118 for each three-phase load. The central controller 200 may also or alternatively monitor for significant power or current unbalance in any one of the multiple three-phase loads. If an unbalance condition exists and one or more variable reactors 118 are at their minimum or maximum settings, then corrective action by the central controller 200 may be required to compensate for the inability of one furnace to achieve its set-point by adjusting the variable reactors and/or electrode positions of another furnace according to a modified set-point.

Figure 6:
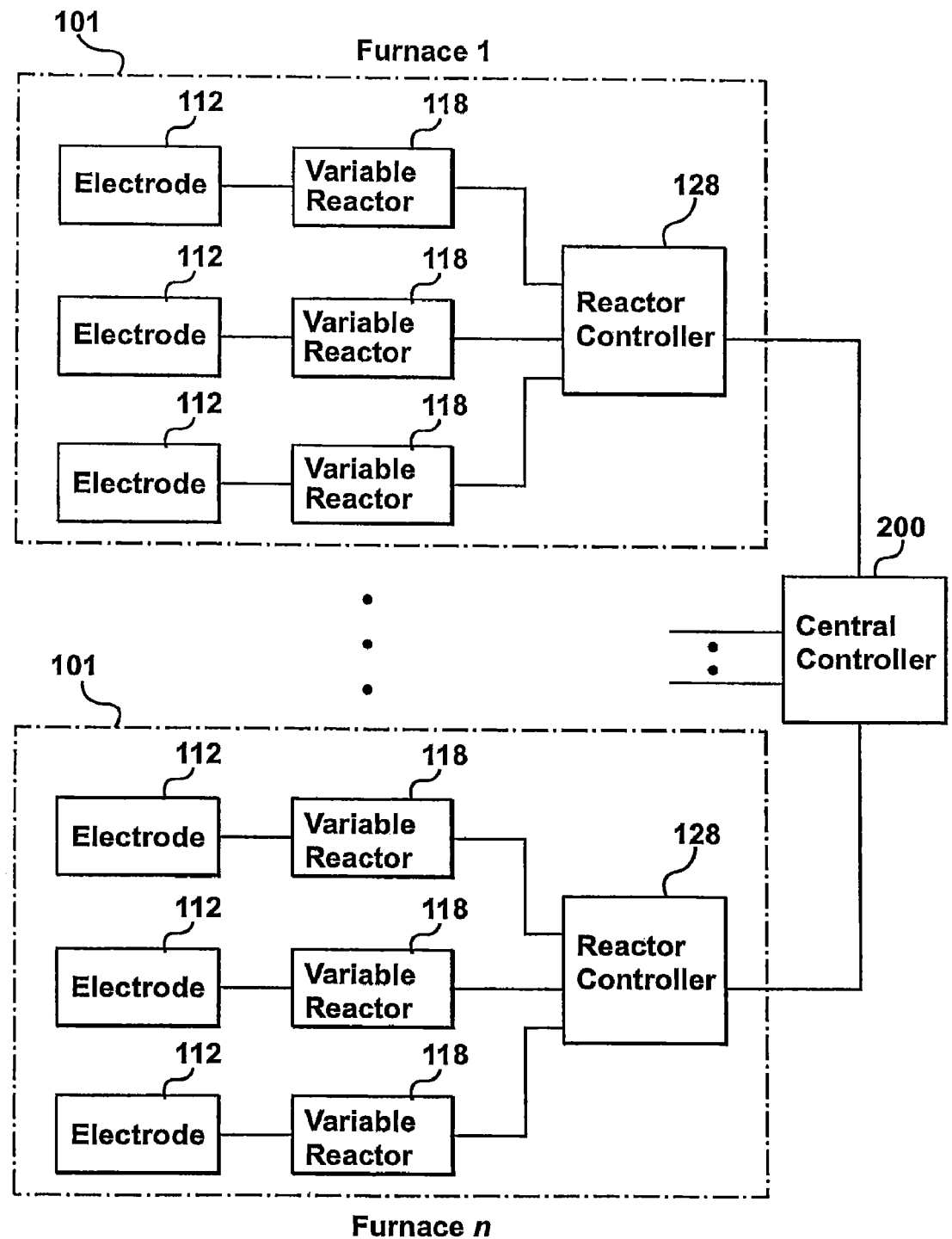
FIG. 6 is a block diagram of an example control system architecture that can be used with the control system of FIG. 5.
Figure 7:
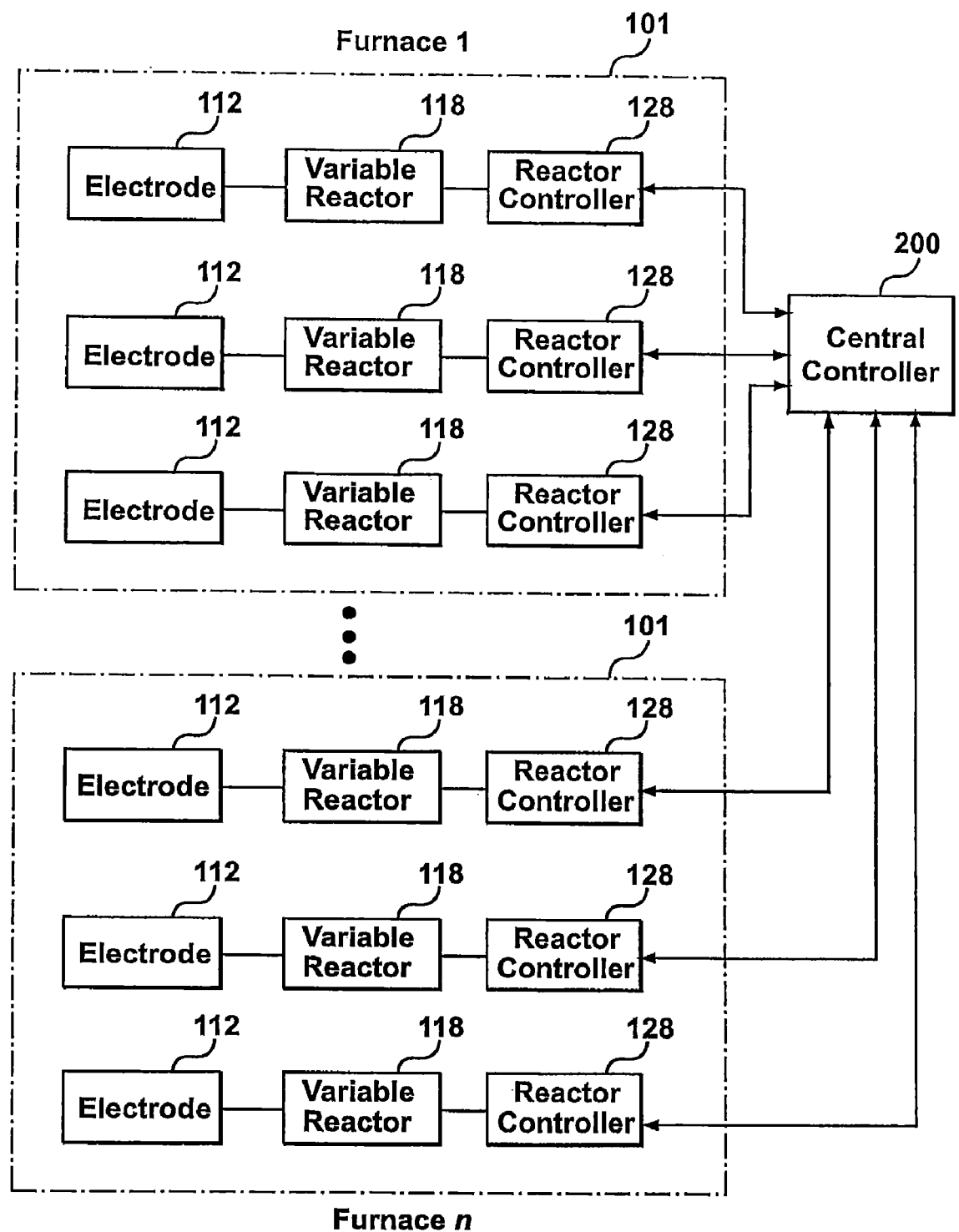
FIG. 7 is a block diagram of a further example control system architecture that can be used with the control system of FIG. 5.

In the case of multiple furnaces, each furnace may have its own 'central' or 'intermediate' level controller coupled to the three variable reactor controllers 128 associated with the three phase load. The central controller 200 may then communicate directly with the intermediate controllers. In other words, there may be a "nesting" of controllers. Alternatively, the variable reactor controller 128 may control more than one variable reactor, as shown in FIG. 6, and communicate directly with central controller 200. The variable reactor controllers 128 may thus act as a form intermediate controller. The central controller 200 may also, or alternatively, communicate directly with the variable reactor controllers 128 for each phase, as shown in FIG. 7.

To monitor the unbalance of each load, the central controller 200 may receive current measurements directly through the current transformers 134. In another embodiment, the central controller 200 may obtain current measurements from the per-phase variable reactor controllers 128. In yet another embodiment, the central controller 200 may obtain current measurements from the intermediate controller for each furnace. In other embodiments, the central controller 200 may receive the calculated unbalance condition of each three-phase furnace from its associated intermediate controller.

In any event, the central controller 200 monitors overall unbalance and/or the unbalance of individual furnaces, and monitors whether a variable reactor associated with one of the furnaces experiencing unbalance is at the end of its range of settings or values. This indicates that the furnace is unable to compensate for the unbalance situation alone. Accordingly, the central controller 200 attempts to compensate for the unbalance of one furnace by introducing offsetting unbalance in one or more of the other furnaces. The central controller 200 monitors and compensates for unbalanced power across all furnaces in the furnace system in this manner.

The central controller 200 determines the amount of negative sequence current $I_2$ required to offset the negative sequence current $I_2$ associated with the unbalanced furnace. As explained above in connection with power stabilization, the central controller 200 may utilize logic rules or algorithms to calculate the appropriate changes required from the remaining furnaces to generate the offsetting negative sequence current $I_2$. The central controller 200 may consult a lookup table stored in memory 222 or database 226 at the central controller 200 to determine the reactance values required to take the appropriate corrective action. The corrective action may include instructing the other furnaces to increase or decrease power or current on one or more phases.

The command signal issued by the central controller 200 to the intermediate controller or to the variable reactor controllers 128 may include override power or current set-points for particular phases, and may include an override duration. In an embodiment wherein the central controller 200 sends its command signal to an intermediate controller and the command signal specifies a particular negative sequence current $I_2$ required from the furnace, then the intermediate controller may store a look-up table setting out the variable reactance values associated with particular negative sequence currents $I_2$, power drawn, and arc impedances. Interpolation may be used to determine values between entries in the table. The intermediate controller may then issue control signals to the per-phase variable reactor controllers 128 specifying the setting of their associated variable reactances 118.

Figure 12:
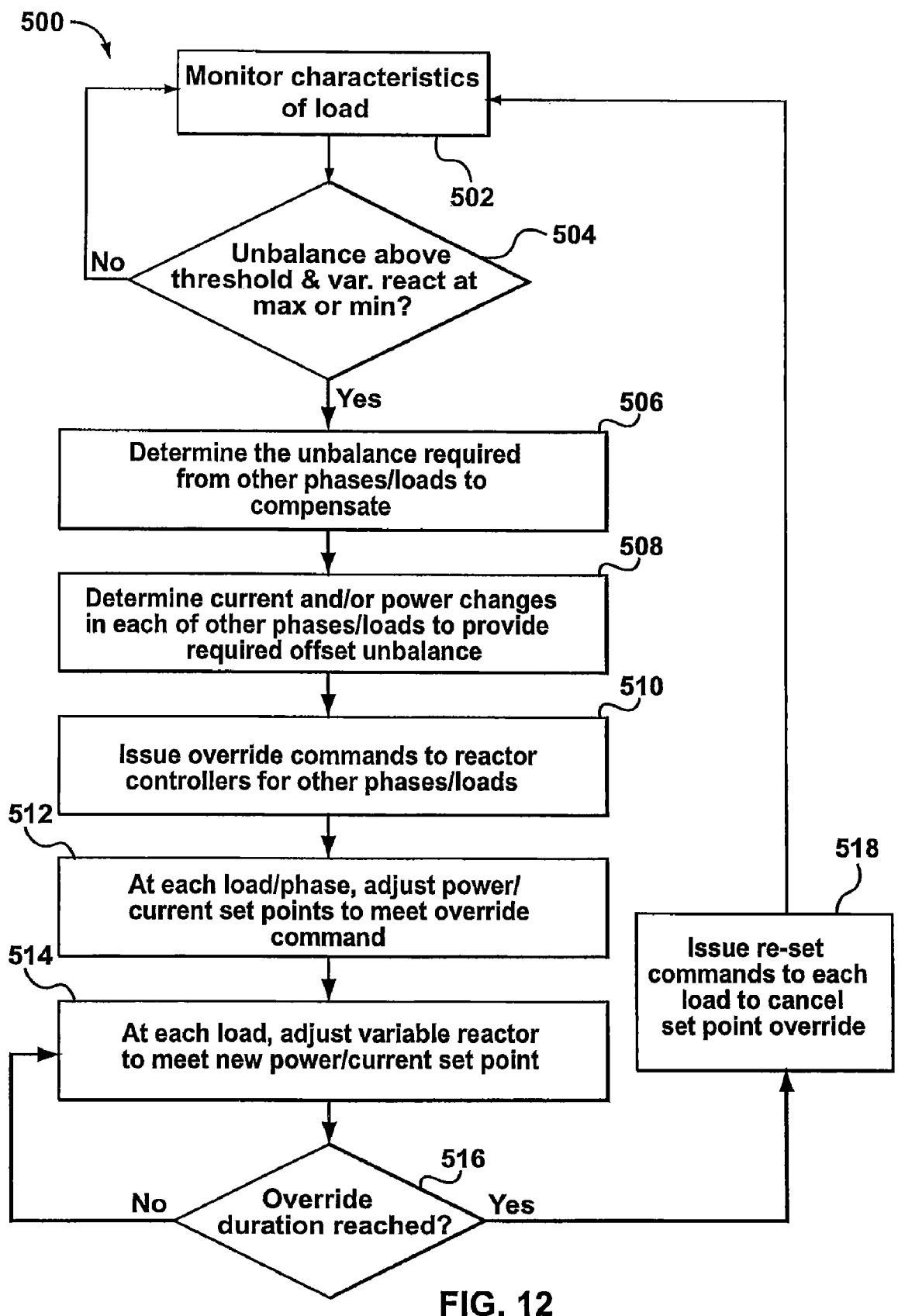
FIG. 12 shows, in flowchart form, a method of compensating for unbalance in multi-phase loads.

Reference is now made to FIG. 12, which shows a method 500 of compensating for unbalance in one or more multi-phase loads. The method 500 begins in step 502, wherein the central controller 200 monitors operating characteristics of the one or more loads/phases. In particular, the central controller 200 monitors whether or not the loads/phases are unbalanced beyond a threshold. The threshold may be set to zero, meaning any unbalance will be noted, but in practice the threshold may be set so as to allow for a small amount of unbalance without triggering compensation. For example, the threshold may be set to about 10%. The central controller 200 may also monitor whether or not the value or setting of the variable reactor 118 of any phase in the one or more loads has reached a maximum or minimum setting.

In step 504, the central controller 200 determines whether or not corrective action is required by assessing whether the unbalance in the one or more loads exceeds a threshold. It may further identify the particular load that has caused the overall unbalance—i.e. the unbalanced load. It also assesses whether the reactance of the variable reactor 118 associated with the unbalanced load has reached a maximum or minimum value. If these conditions have occurred, then the central controller 200 recognizes that compensation is required to re-balance the power consumption and the method continues to step 506. If these conditions do not exist, i.e. if the overall system is balanced or if the associated variable reactor 118 has not reached a maximum or minimum value, then the method returns to step 502 to continue monitoring the situation.

In step 506, the central controller 200 determines the extent to which it must take corrective action to compensate for the detected unbalance. In a single multi-phase load embodiment, it determines the magnitude of the unbalance on one phase and determines the adjustments that must be made to the other phases to compensate and balance the system. In a multi-furnace embodiment, it determines the negative sequence current $I_2$ for the unbalanced furnace so as to identify the extent to which offsetting negative sequence current is required from the other loads so as to balance the overall system.

In step 508, the central controller 200 determines the current and/or power changes required within the other furnaces (other than the furnace experiencing difficulty) to compensate for the unbalance. For example, and as described by way of example below in connection with FIGS. 4 to 6, in a multi-load scenario, the central controller 200 may determine the negative sequence currents necessary on each phase to cancel the negative sequence currents attributable to the unbalanced load. The central controller 200 may then allocate the required per-phase negative sequence currents to each of the loads and calculate the per-phase adjustments required at each load to introduce sufficient unbalance to produce the negative sequence current.

The central controller 200 may employ a number of rules or algorithms to determine how other loads can compensate for unbalance. In some embodiments, the required unbalance may be apportioned equally between the other furnaces. In other embodiments, more complicated rules may apply for determining the relative apportionment of the unbalance required.

In one embodiment, the central controller 200 may store a look-up table in database 226 or memory 222. The look-up table may specify, for particular unbalance conditions, the corresponding power and/or current adjustments on each phase of the other loads to counteract the unbalance. The central controller 200 may further apply interpolation for values that fall between two entries in the look-up table.

Once the central controller 200 has determined the relative power and/or adjustments required from each phase in the other loads to compensate for the unbalance, then in step 510 it issues override commands to the variable reactor controllers 128 associated with the other phases/loads. It may, for example, send a control signal specifying a new load-specific power or current set-point. Alternatively, it may send a control signal specifying an increment by which the existing load-specific power or current set-point should be increased. The override command may also include an override duration. The override duration may be a predetermined value stored at the central controller 200. The override duration may be dependent upon the situation and may be specified by the look-up table.

Each of the variable reactor controllers 128 associated with each phase on the other loads receives its override command in step 512 and adjusts its operation accordingly.

This may, for example, include adjusting a load-specific (or phase-specific) power or current set-point. In step 514, the variable reactor controllers 128 adjust their associated variable reactor 118 to comply with the override settings specified by the override command. Accordingly, the values of the variable reactors 118 are changed and the power and/or current drawn by each of the other phases/loads is varied. The variable reactor controllers 128 maintain the adjusted load-specific power and/or current set-points until the override duration expires. In step 516, the variable reactor controllers 128 determine whether or not the override duration has expired. If so, then in step 518 they re-set their load-specific power and/or current set-points to remove the override component and return to normal operation. The method 500 then returns to step 502, wherein the central controller 200 continues its monitoring function.

In an alternative embodiment, at step 518 the central controller 200 reassesses the unbalance of the loads and determines whether or not the problematic load has returned to normal operation, e.g. whether or not the unbalance problem has been resolved. If so, then it cancels the override commands and returns to step 502. If not, then it may either extend the override period, modify the override commands in accordance with further instructions in the look-up table, or cancel the override and alert an operator to the problem.

In general, it is desired to keep the duration of the override relatively short, in order to let each furnace maintain its own set-point, if possible. Also, increases in power set-points may be beyond the rated capacity of certain power supply components and should be limited in duration so that the increased set-points do not exceed the overload capability curve of the equipment. Such capability curves typically allow a larger short term capacity than the continuous rating, without equipment damage. Thus, a shorter duration of the overload allows a higher set-point increase. For example, a transformer overload curve may allow an increase of 200% over its rated value for a few seconds, but only 110% over its rated value for durations of up to five minutes. The allowed override durations for each override magnitude may be calculated and stored in a look-up table in database 226.

A set-point override may end as a result of the duration expiring or correction of the deviation which gave rise to the override. Once the override is ended, the set-point may be allowed to return to its original level. This return may be allowed at a pre-determined rate, so as to ramp down gradually and avoid a large change in power values. For example, the set-pint may be allowed to reduce or increase to its original level at a rate of about 1% per second.

In one embodiment of method 500, step 504 may also include monitoring a degree of deviation and time period over which the deviation extends, for a given operating characteristic, such as power or current. For example, if the monitored operating characteristic deviates from its set-point by more then a predetermined deviation (i.e. exceeds a threshold), central controller 200 may determine that corrective action is required. The predetermined degree of deviation may also be tied to an acceptable time period for the duration.

The degree and period of deviation permitted before the central controller 200 determines that corrective action is required vary inversely in relation to each other. For example, the larger the degree of deviation, the shorter the allowed time period for that deviation. Conversely, a small degree of deviation may be permitted to persist for a relatively long period of time. For example, a deviation of 20% may only be permitted for a fraction of second before taking corrective action, whereas a deviation of less than 5% may be permitted for many seconds or a few minutes.

According to the one embodiment, the cross-compensation among the furnaces may be performed as follows. Central controller 200 monitors the number of furnaces in operation and monitors the set-point and actual power, current and unbalance in each furnace. Central controller 200 determines if any of the operating characteristics of the furnaces has deviated from its set-point by more then a predetermined amount and if the local variable reactance controller 128 has not corrected for the deviation. The central controller 200 may determine this by monitoring the variable reactor settings of the relevant furnace to determine if the settings have hit a limit value, so that they are no longer adjustable. Alternatively, the central controller 200 may monitor the period of time of the deviation. A deviation longer than, say, five cycles may be an indication that the variable reactor controller has encountered an adjustment limit and is unable to make further adjustments as required for the necessary compensation.

If the central controller determines that corrective action is required, it apportions the deviation to other operating furnaces, based on the actual operating characteristic in those furnaces. Central controller 200 then issues a set-point override command to the other furnaces and specifies a duration of the override. If a second set-point change becomes required during the override duration, a further set-point override may be issued to the remaining furnaces that are within a control range of the variable reactors associated with those furnaces. This is illustrated in Table 1 below, where the furnace power of furnace F4 drops from 70 megawatts to 30 megawatts at time t0, followed by a power drop in furnace F3 from 100 megawatts to 90 megawatts at time t1.

TABLE 1

Power Compensation Over Time
F4 furnace power drops from 70 to 30 followed by a F3 power drop from 100 to 90.

| Furnace | Power at Time t0 | Power at Time t1 | Power at Time t2 |
|---|---|---|---|
| F1 | 40 | 40 + (¼ * 40) = 50 | 50 + ½ * 10 = 55 |
| F2 | 40 | 40 + (¼ * 40) = 50 | 50 + ½ * 10 = 55 |
| F3 | 80 | 80 + (½ * 40) = 100 | 90 |
| F4 | 70 | 30 | 30 |
| Total Power | 230 | 230 | 230 |

Figure 8:
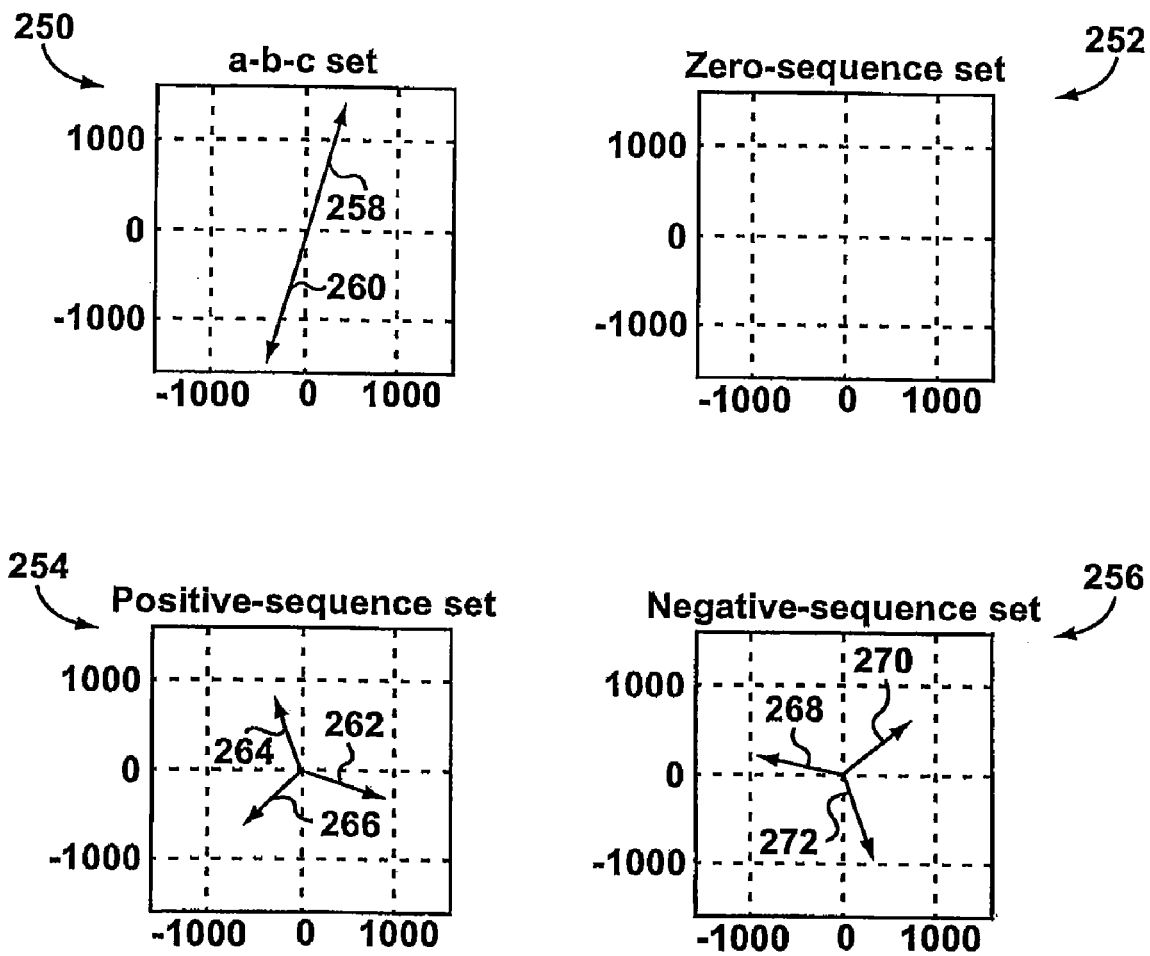
FIG. 8 graphically shows an example of phasor diagrams of a first furnace under a loss of arc condition.
Figure 9:
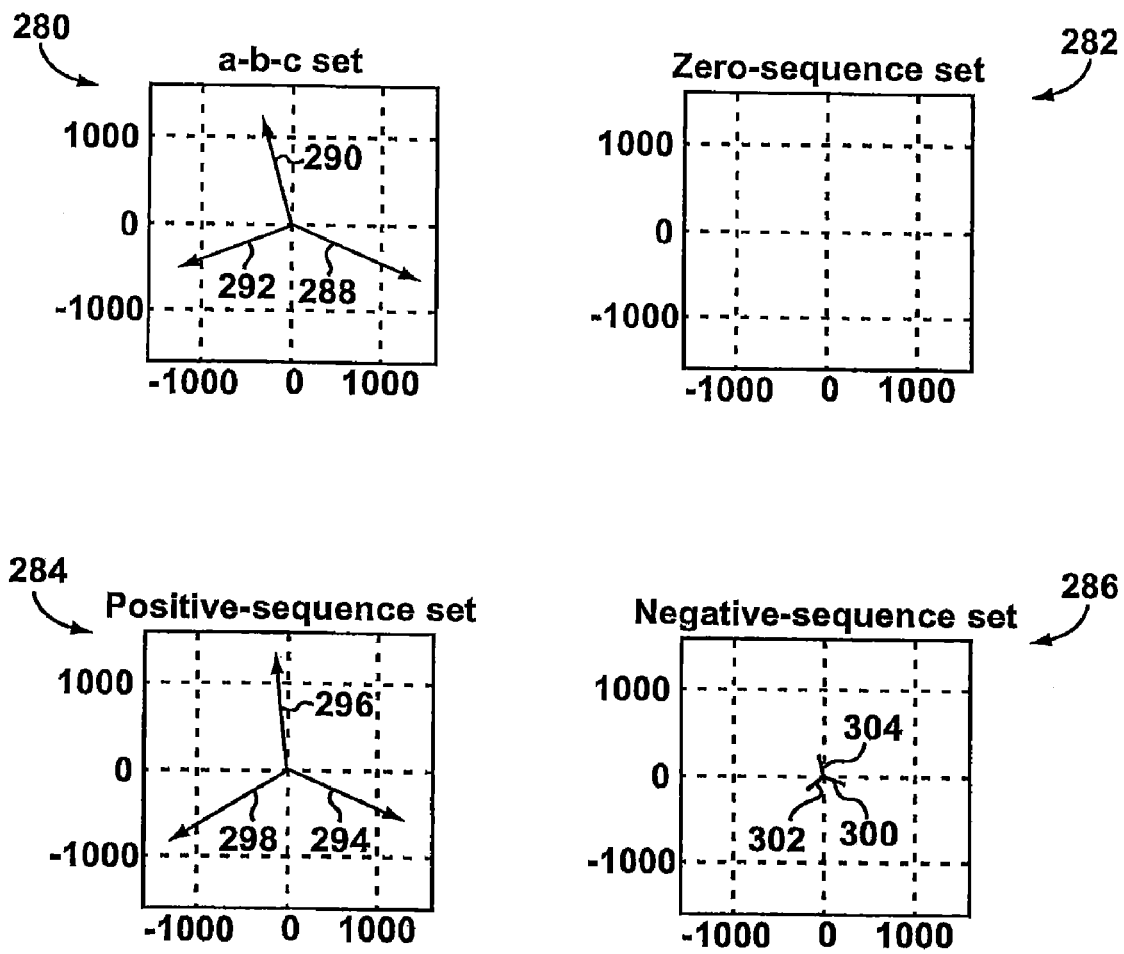
FIG. 9 graphically shows an example of phasor diagrams of other furnaces compensating for the loss of arc condition shown in FIG. 8.
Figure 10:
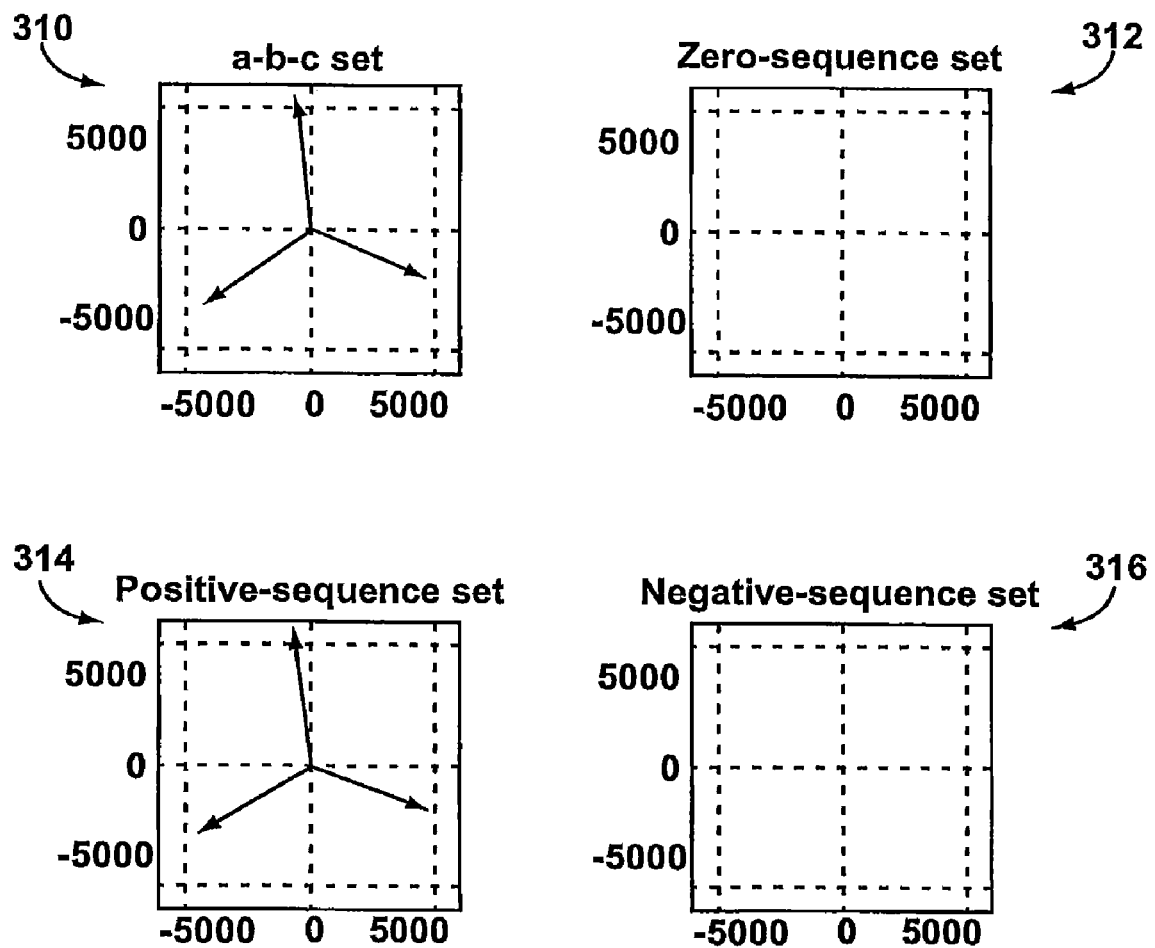
FIG. 10 graphically shows an example of phasor diagrams of the total power draw of the furnaces represented in FIGS. 8 and 9.

Reference is now made to FIGS. 8, 9, and 10 which graphically show phasor diagrams for an example embodiment according to the present invention. In the example embodiment, the power control system 100 (FIG. 4) includes four three-phase loads: Furnaces F1, F2, F3, and F4. The arcon phase A of Furnace F1 has been extinguished.

(FIG. 8, shows four phasor diagrams 250, 252, 254, 256 based on the current drawn by Furnace F1. The first phasor diagram 250 shows the a-b-c current components of the three phases of the three-phase load, where one of the phases has dropped out. In particular, the first phasor diagram 250 shows a phase B current component 258 and a phase C current component 260. No phase A current component is visible due to the loss of arc on phase A.

A set of three-phase vectors may be decomposed into three sets of balanced vectors: the positive-sequence set, the zero-sequence set and the negative-sequence set. All of the phasors within the positive-sequence set have the same magnitude, as do all of the phasors within the negative-sequence set and the zero-sequence set. A perfectly balanced system will have a positive-sequence set that matches the a-b-c current phasor diagram. An unbalanced system will have a negative-sequence set and/or a zero sequence set with non-zero magnitude phasors. For a three-wire system such as the one in the example, no zero-sequence current may flow, so the zero-sequence set for all conditions may be have zero magnitude.

In FIG. 8, the third phasor diagram 254 shows the positive-sequence set of phasors for the case where the arc on phase A has been lost. The fourth phasor diagram 256 shows the negative-sequence set. The positive-sequence set includes positive-sequence phasors for phase A 262, phase B 264, and phase C 266. Similarly, the negative-sequence set includes negative-sequence phasors for phase A 268, phase B 270, and phase C 272. It will be noted that summing the third phasor diagram 254 and the fourth phasor diagram 256 will result in the first phasor diagram 250, since the positive-sequence phasor for phase A 262 will cancel the negative-sequence phasor for phase A 268.

The power control system 100 recognizes that the power has dropped in Furnace F1 and that the reactor controller 128 (FIG. 4) for Furnace F1 has been unable to correct for the drop in power and the unbalance condition. The overall power drawn by the four furnaces drops by the amount that Furnace F1 falls short of its power set-point and the unbalance condition in Furnace F1 causes an overall unbalance condition in the power drawn by the four furnaces. Accordingly, the power control system 100 instructs the reactor controllers 128 for Furnaces F2, F3, and F4 to adjust the variable reactors 118 (FIG. 4) for Furnaces F2, F3, and F4, to increase the power drawn by those furnaces and introduce a measure of phase unbalance to counteract the unbalance caused by Furnace F1.

FIG. 9 shows four phasor diagrams 280, 282, 284, 286, based upon the current in Furnaces F2, F3 and F4, after the reactor controllers 128 adjust the variable reactors 118. The first phase diagram 280 shows current phasors for phase A 288, phase B 290, and phase C 292. The phasors 288, 290, 292 have different magnitudes and are not 120 degrees out of phase from each other—i.e. they are not balanced.

The third phasor diagram 284 shows the positive-sequence phasors for phase A 294, phase B 296, and phase C, and the fourth phasor diagram 286 shows the negative-sequence phasors for phase A 300, phase B 302, and phase C 304. The magnitude of the negative-sequence phasors 300, 302, 304 in the fourth phasor diagram 286 are indicative of the amount of unbalance introduced to each of the Furnaces F2, F3, and F4 through adjustment of their variable reactors 118.

FIG. 10 shows four phasor diagrams 310, 312, 314, 316 for the overall sum of currents drawn by all four Furnaces F1, F2, F3, and F4. It will be appreciated that the sum of currents is balanced, as indicated by the absence of any negative-sequence phasors in the fourth phasor diagram 316 and by the match between the first phasor diagram 310 and the third phasor diagram 314.

The following two tables further illustrate the above-described example. The first table, Table 2, shows the values of certain variables in the case where there is no power stabilization system. The second table, Table 3, shows the values of those variables after adjustments by the power control system 100 (FIG. 4).

TABLE 2 no power stabilization or unbalance compensation

|    | $X_{varA}$ Ohms | $X_{varB}$ Ohms | $X_{varC}$ Ohms | $P_{sp}$ MW | P MW | $I_A$ A | $I_B$ A | $I_C$ A | $I_1$ A | $I_2$ A | $I_2/I_1$ % |
|----|------|------|------|----|-----|------|------|------|------|-----|-------|
| F1 | 3.9  | 3.9  | 3.9  | 70 | 35  | 0    | 1262 | 1262 | 729  | 729 | 100.0 |
| F2 | 3.9  | 3.9  | 3.9  | 70 | 70  | 1458 | 1458 | 1458 | 1458 | 0   | 0.0   |
| F3 | 3.9  | 3.9  | 3.9  | 70 | 70  | 1458 | 1458 | 1458 | 1458 | 0   | 0.0   |
| F4 | 3.9  | 3.9  | 3.9  | 70 | 70  | 1458 | 1458 | 1458 | 1458 | 0   | 0.0   |
| Total |   |      |      | 280 | 245 |     |      |      | 5103 | 729 | 14.29 |

TABLE 3 power stabilization and unbalance compensation

|    | $X_{varA}$ Ohms | $X_{varB}$ Ohms | $X_{varC}$ Ohms | $P_{sp}$ MW | P MW | $I_A$ A | $I_B$ A | $I_C$ A | $I_1$ A | $I_2$ A | $I_2/I_1$ % |
|----|---|-----|-----|----|----|------|------|------|------|-----|-------|
| F1 | 0 | 0   | 0   | 70 | 46 | 0    | 1443 | 1443 | 833  | 833 | 100.0 |
| F2 | 0 | 6.8 | 0.5 | 70 | 78 | 1783 | 1431 | 1373 | 1516 | 269 | 17.74 |
| F3 | 0 | 6.8 | 0.5 | 70 | 78 | 1783 | 1431 | 1373 | 1516 | 269 | 17.74 |
| F4 | 0 | 6.8 | 0.5 | 70 | 78 | 1783 | 1431 | 1373 | 1516 | 269 | 17.74 |
| Total |  |    |     | 280 | 280 |    |      |      | 5371 | 49  | 0.91  |

In Tables 2 and 3, the current on phase A of furnace F1 is zero in both cases and the first furnace, F1, is 100% unbalanced. In both cases, the desired power set-point for each furnace is 70 MW with an overall total power-set-point of 280 MW. In the case where there is no power stabilization, the three other furnaces F2, F3, and F4 are fully balanced and operate at the power set-point of 70 MW. The overall result for the system in this case is a power drop of about 35 MW and an unbalance of over 14%.

In the second case, where the power control system 100 has caused adjustments to be made to the variable reactances 118 (FIG. 4) in Furnaces F2, F3, and F4, the overall power draw of the four furnaces is maintained at the total power set-point of 280 MW by increasing the power drawn by furnaces F2, F3, and F4. It will be apparent from Table 3 that adjustments have been made to the variable reactors 118 in furnaces F2, F3, and F4 so as to adjust the current drawn by each phase of those furnaces, thereby increasing the power consumed and increasing the unbalance in each furnace. The unbalance introduced to furnaces F2, F3, and F4 is approximately 17.74%, although the effect is to reduce the overall phase unbalance seen by the power generator to less than 1%.

Although the variable reactor 118 has been shown as including a single pair of thyristor switches, it will be appreciated that other configurations could be used for variable reactor 118, such as a multi-stage thyristor switch, for example. Alternatively, other types of power switches could be used in the place of thyristors Described below is a control method for a 3-phase, 3-wire furnace load to achieve 3-phase power stabilization and unbalance minimization using independent control of in line variable reactances. If the source voltages are balanced, 3-phase power stabilization and unbalance current reduction will also result in unbalance power reduction as the (per-phase powers become more equalized).

In order for the control method to be performed, the following pre-calculation method is done off-line and the results are stored in a lookup table of database 226 for reference.

1. Consider a set of desired power set-points;
2. Consider a set of possible system impedances in different configurations (for instance, each change of furnace transformer tap constitutes a change of system impedance);
3. Consider the known lower and upper bounds for the variable reactances;
4. Consider the expected range of the furnace load impedance in each phase;
5. For each power set-point and system configuration, and each set of load impedances, calculate the values for variable reactance Xvar in each phase that meet equations 1 and 2, where each Xvar is within the range limited by the upper and lower bounds;
6. If a feasible solution is not found in step 5 to meet the desired power set-point, set all Xvars to their upper or lower bound value in order to meet the value closest to the desired power set-point without regards to the unbalance value.
7. Record the Xvar values obtained in 5 or 6 in a lookup table, according to impedance values.
8. Continue through the set of load impedances until the lookup table is completed.
9. Repeat steps 5-8 for all other desired set-points and system configurations.
10. If the variable reactance is obtained through application of thyristors, instead of, or in addition to, calculating the Xvar, the amount of the thyristor gating angle corresponding to the Xvar value can be directly calculated and recorded.

Once the lookup tables are created, the following method is performed during furnace operation:

1. Measure furnace load impedance for each phase through measurement of load current and voltage
2. Obtain the desired power set-point
3. Obtain the information on system configuration
4. Find the appropriate Table corresponding to the desired power set-point and system configuration
5. For each load impedance value read the corresponding amount of Xvar's from the lookup table. If the measured load impedance value lies in between in the index values in the table, find the corresponding value of the Xvar through interpolation.
6. Set the value of the variable reactors to the calculated value.
7. If the gating angles are stored in the lookup tables instead of the Xvar values, the values read are the gating angles. If not, the Xvar values are converted to gating angles.

Table 4 below shows an example of the application of the above method for 10 different cases of load impedance. The goal is to maintain the power set-point of 54 MW and minimize the unbalance current in a furnace load supplied by a 3-phase 3-wire system. These results can be compared with the cases shown in Table 5, where the goal did not involve unbalance compensation and the Xvar values in 3 phases were equal to values required to maintain the 3-phase power set-point. In this case the lower bound on Xvar is 0 and the unbalance current is equal to I2 (no zero sequence current can flow).

In cases 1, 2, 4, 5 and 7 in Table 4, the power set-point can be maintained, while the unbalance is reduced to almost zero. In cases 3, 6 and 8, the power set-point can be maintained but the unbalance is not zero while still lower than the case without unbalance compensation. This is because the lower bound is reached in Xvar on at least one of the phases.

In cases 9 and 10 all Xvar values are set at zero to maximize the power and bring it closest the set-point value. However, this is done by neglecting the magnitude of unbalance current, as maintaining the power level has the higher priority. The reduction in unbalance current is evident from comparing Table 5 with 4.

TABLE 4

| | With unbalance compensation (per phase power balancing) | | | | | | | | | | | | |
|---|---|---|---|---|---|---|---|---|---|---|---|---|---|
| Case | Ra Ohms | Rb Ohms | Rc Ohms | XvarA Ohms | XvarB Ohms | XvarC Ohms | P MW | Pa MW | Pb MW | Pc MW | I1 A | I2 A | I2 % of I1 |
| 1 | 11.5 | 11.5 | 11.5 | 7.3 | 7.2 | 7.2 | 54.0 | 18.0 | 18.0 | 18.0 | 1251 | 0 | 0.0 |
| 2 | 17.1 | 11.5 | 11.5 | 7.0 | 10.2 | 3.8 | 54.0 | 18.0 | 18.0 | 18.0 | 1161 | 0 | 0.0 |
| 3 | 24.5 | 11.5 | 11.5 | 5.6 | 12.4 | 0.0 | 54.0 | 17.9 | 18.8 | 17.3 | 1074 | 45 | 4.2 |
| 4 | 17.1 | 17.1 | 11.5 | 3.2 | 9.6 | 6.4 | 54.0 | 18.0 | 18.0 | 18.0 | 1088 | 0 | 0.0 |
| 5 | 24.5 | 17.1 | 11.5 | 1.8 | 12.5 | 0.7 | 54.0 | 18.0 | 18.0 | 18.0 | 1009 | 0 | 0.0 |
| 6 | 24.5 | 24.5 | 11.5 | 0.0 | 9.5 | 1.1 | 54.0 | 17.1 | 17.2 | 19.8 | 959 | 90 | 9.4 |
| 7 | 17.1 | 17.1 | 17.1 | 5.4 | 5.5 | 5.5 | 54.0 | 18.0 | 18.0 | 18.0 | 1027 | 0 | 0.0 |
| 8 | 24.5 | 17.1 | 17.1 | 2.9 | 6.9 | 0.0 | 54.0 | 17.8 | 18.5 | 17.8 | 962 | 25 | 2.6 |
| 9 | 24.5 | 24.5 | 17.1 | 0.0 | 0.0 | 0.0 | 53.1 | 16.2 | 17.3 | 19.6 | 902 | 100 | 11.1 |

TABLE 4-continued

With unbalance compensation (per phase power balancing)

| Case | Ra Ohms | Rb Ohms | Rc Ohms | XvarA Ohms | XvarB Ohms | XvarC Ohms | P MW | Pa MW | Pb MW | Pc MW | I1 A | I2 A | I2 % of I1 |
|---|---|---|---|---|---|---|---|---|---|---|---|---|---|
| 10 | 24.5 | 24.5 | 24.5 | 0.0 | 0.0 | 0.0 | 47.5 | 15.8 | 15.8 | 15.8 | 804 | 0 | 0.0 |

TABLE 5

Without Unbalance compensation (without per phase power balancing)

| Case | Ra Ohms | Rb Ohms | Rc Ohms | XvarA Ohms | XvarB Ohms | XvarC Ohms | P MW | Pa MW | Pb MW | Pc MW | I1 A | I2 A | I2 % of I1 |
|---|---|---|---|---|---|---|---|---|---|---|---|---|---|
| 1 | 11.5 | 11.5 | 11.5 | 7.2 | 7.2 | 7.2 | 54.0 | 18.0 | 18.0 | 18.0 | 1251 | 0 | 0 |
| 2 | 17.1 | 11.5 | 11.5 | 7.0 | 7.0 | 7.0 | 53.7 | 17.4 | 20.3 | 16.0 | 1164 | 126 | 10.8 |
| 3 | 24.5 | 11.5 | 11.5 | 6.4 | 6.4 | 6.4 | 52.7 | 15.7 | 22.5 | 14.5 | 1082 | 249 | 23.0 |
| 4 | 17.1 | 17.1 | 11.5 | 6.5 | 6.5 | 6.5 | 53.8 | 15.7 | 19.3 | 18.7 | 1091 | 111 | 10.1 |
| 5 | 24.5 | 17.1 | 11.5 | 5.2 | 5.2 | 5.2 | 53.9 | 14.6 | 21.3 | 17.9 | 1026 | 195 | 19.0 |
| 6 | 24.5 | 24.5 | 11.5 | 3.5 | 3.5 | 3.5 | 53.4 | 14.1 | 18.5 | 20.7 | 959 | 194 | 20.2 |
| 7 | 17.1 | 17.1 | 17.1 | 5.5 | 5.5 | 5.5 | 54.0 | 18.0 | 18.0 | 18.0 | 1027 | 0 | 0.0 |
| 8 | 24.5 | 17.1 | 17.1 | 3.5 | 3.5 | 3.5 | 53.9 | 16.3 | 20.1 | 17.5 | 966 | 115 | 11.9 |
| 9 | 24.5 | 24.5 | 17.1 | 0.0 | 0.0 | 0.0 | 53.1 | 16.2 | 17.3 | 19.6 | 902 | 100 | 11.1 |
| 10 | 24.5 | 24.5 | 24.5 | 0.0 | 0.0 | 0.0 | 47.5 | 15.8 | 15.8 | 15.8 | 804 | 0 | 0.0 |

Described below is a control method for 3-phase, 3-wire furnace load current stabilization and unbalance minimization using independent control of in-line variable reactances. Current stabilization is defined as controlling the positive sequence component of the current.

The following pre-calculation is done while the furnace system is off line and the resulting lookup tables are stored in the control system memory for reference.

1. Consider a set of desired current set-points $I_{sp}$.

2. Consider a set of possible system impedances in different configurations (for instance, each change of furnace transformer tap constitutes a change of system impedance)

3. Consider the known lower and upper bounds for the variable reactance.

4. Consider the expected range of the furnace load impedance in each phase

5. For each current set-point and system configuration, and each set of load impedances, calculate the values for Xvar in each phase that meet the conditions below:

$|I_1|=I_{sp}$ $|I_2|=$min value where each Xvar is within the range limited by the upper and lower bounds.

6. If a feasible solution is not found in step 5 to meet the desired current set-point, set all Xvar values to their upper or lower bound value in order to meet the value closest to the desired current set-point, without regard to the unbalance value.

7. Record the Xvar values obtained in 5 or 6 in a lookup table.

8. Continue through the set of load impedances until the lookup table is completed.

9. Repeat steps 5-8 for all other desired set-points and system configurations.

10. If the variable reactance is obtained through application of thyristors, instead of, or in addition to, calculating the Xvar value, the amount of the corresponding thyristor gating angle may be directly calculated and recorded.

Once the lookup tables are created, the following method is performed during furnace operation:

1. Measure furnace load impedance for each phase through measurement of load current and voltage 2. Obtain the desired current set-point 3. Obtain the information on system configuration 4. Find the appropriate lookup table corresponding to the desired current set-point and system configuration 5. For each load impedance value, read the corresponding amount of Xvar's from the lookup table. If the measured load impedance value lies in between in the index values in the lookup table, find the corresponding Xvar value through interpolation.

6. Set the value of the variable reactors to the calculated value.

7. If the gating angles are stored in the lookup tables instead of Xvar's, the values read are gating angles directly. If not, the reactance values are converted to gating angles.

Table 6 below shows an example of the application of the above method for 10 different cases of load impedance. The goal is to maintain the current set-point of 1030+/−5 A and minimize the unbalance current in a furnace load supplied by a 3-phase 3-wire system operating from a 34.5 kV source. These results can be compared with Table 7, where the goal did not involve unbalance compensation. In this case, the lower bound on Xvar is 0 and the unbalance current is equal to I2 (no zero sequence current can flow).

In cases 1 to 5 and 7 in Table 6, the current set-point can be maintained, while the unbalance is reduced to almost zero. In cases 6 and 8, the set-point can be maintained, but the unbalance is not zero (although still lower than the case without compensation). This is because the lower bound is reached in Xvar on at least one of the phases.

In cases 9 and 10, all Xvar values are set at zero to maximize the current and bring it closest the set-point value. However, this is done at the expense of neglecting the magnitude of unbalance current, as maintaining the current level has had the higher priority. As is evident from a comparison of Tables 6 and 7, compensation using the variable reactors allows for substantially improved current stabilization and unbalance values within the normally acceptable level of 10%.

closest to the desired 3-phase power set-point, without regard to the per-phase power stabilization.

7. Record the Xvar values obtained in 5 or 6 in a lookup table.

TABLE 6

Current Stabilization and Unbalance Minimization With Compensation

| Case | Ra Ohms | Rb Ohms | Rc Ohms | XvarA Ohms | XvarB Ohms | XvarC Ohms | P MW | Ia A | Ib A | Ic A | I1 A | I2 A | I2 % of I1 |
|---|---|---|---|---|---|---|---|---|---|---|---|---|---|
| 1 | 11.5 | 11.5 | 11.5 | 11.8 | 11.8 | 11.8 | 36.5 | 1029 | 1029 | 1029 | 1029 | 0 | 0.0 |
| 2 | 17.1 | 11.5 | 11.5 | 10.3 | 13.5 | 7.1 | 42.3 | 1027 | 1027 | 1027 | 1027 | 1 | 0.1 |
| 3 | 22.6 | 11.5 | 11.5 | 8.3 | 14.7 | 1.8 | 48.2 | 1027 | 1026 | 1028 | 1027 | 1 | 0.1 |
| 4 | 17.1 | 17.1 | 11.5 | 5.0 | 11.4 | 8.2 | 48.3 | 1029 | 1029 | 1030 | 1029 | 1 | 0.1 |
| 5 | 22.6 | 17.1 | 11.5 | 2.2 | 11.9 | 2.2 | 54.0 | 1028 | 1027 | 1027 | 1027 | 1 | 0.1 |
| 6 | 22.6 | 22.6 | 11.5 | 0.0 | 7.1 | 0.6 | 58.2 | 1001 | 963 | 1125 | 1027 | 100 | 9.7 |
| 7 | 17.1 | 17.1 | 17.1 | 5.3 | 5.3 | 5.3 | 54.4 | 1031 | 1031 | 1031 | 1031 | 0 | 0.0 |
| 8 | 22.6 | 17.1 | 17.1 | 0.4 | 2.4 | 0.0 | 59.5 | 971 | 1080 | 1032 | 1027 | 63 | 6.1 |
| 9 | 22.6 | 22.6 | 17.1 | 0.0 | 0.0 | 0.0 | 55.8 | 898 | 925 | 1032 | 950 | 84 | 8.8 |
| 10 | 22.6 | 22.6 | 22.6 | 0.0 | 0.0 | 0.0 | 51.2 | 868 | 868 | 868 | 868 | 0 | 0.0 |

TABLE 7

Without Compensation

| Case | Ra Ohms | Rb Ohms | Rc Ohms | XvarA Ohms | XvarB Ohms | XvarC Ohms | P MW | Ia A | Ib A | Ic A | I1 A | I2 A | I2 % of I1 |
|---|---|---|---|---|---|---|---|---|---|---|---|---|---|
| 1 | 11.5 | 11.5 | 11.5 | 5.5 | 5.5 | 5.5 | 63.0 | 1352 | 1352 | 1352 | 1352 | 0 | 0.0 |
| 2 | 17.1 | 11.5 | 11.5 | 5.5 | 5.5 | 5.5 | 60.2 | 1120 | 1362 | 1230 | 1233 | 141 | 11.4 |
| 3 | 22.6 | 11.5 | 11.5 | 5.5 | 5.5 | 5.5 | 56.9 | 946 | 1356 | 1162 | 1142 | 239 | 20.9 |
| 4 | 17.1 | 17.1 | 11.5 | 5.5 | 5.5 | 5.5 | 57.2 | 1024 | 1134 | 1228 | 1126 | 118 | 10.4 |
| 5 | 22.6 | 17.1 | 11.5 | 5.5 | 5.5 | 5.5 | 54.1 | 870 | 1135 | 1143 | 1042 | 173 | 16.6 |
| 6 | 22.6 | 22.6 | 11.5 | 5.5 | 5.5 | 5.5 | 51.2 | 829 | 968 | 1120 | 965 | 170 | 17.6 |
| 7 | 17.1 | 17.1 | 17.1 | 5.5 | 5.5 | 5.5 | 54.0 | 1027 | 1027 | 1027 | 1027 | 0 | 0.0 |
| 8 | 22.6 | 17.1 | 17.1 | 5.5 | 5.5 | 5.5 | 50.9 | 876 | 1021 | 960 | 951 | 84 | 8.8 |
| 9 | 22.6 | 22.6 | 17.1 | 5.5 | 5.5 | 5.5 | 48.0 | 823 | 875 | 946 | 880 | 72 | 8.2 |
| 10 | 22.6 | 22.6 | 22.6 | 5.5 | 5.5 | 5.5 | 45.1 | 815 | 815 | 815 | 815 | 0 | 0.0 |

Described below is a control method for 3-phase 3-wire furnace load per-phase power stabilization with unequal power set-points using independent control of in-line variable reactances. If the source voltages are balanced, per-phase power stabilization with unequal set-points would mean 3-phase power stabilization along with maintaining the unbalance current at a fixed value.

The following pre-calculation is done off line and results are stored in the control system memory for reference.

1. Consider a set of desired per-phase power set-points.

2. Consider a set of possible system impedances in different configurations (for instance, each change of furnace transformer tap constitutes a change of system impedance).

3. Consider the known lower and upper bounds for the variable reactance.

4. Consider the expected range of the furnace load impedance in each phase.

5. For each 3-phase power set-point (the sum of the 3 per-phase power set-points) and system configuration, and each set of load impedance, calculate the values for Xvar in each phase that meet equation 1 and minimize the deviation in each phase power to its corresponding power set-point, where each Xvar is within the range limited by the upper and lower bounds.

6. If a feasible solution is not found in step 5 to meet the desired 3-phase power set-point, set all Xvar values to their upper or lower bound values in order to meet the value 8. Continue through the set of load impedances until the lookup table is completed.

9. Repeat steps 5-8 for all other desired set-points and system configurations.

10. If the variable reactance is obtained through application of thyristors, instead of, or in addition to, calculating the Xvar value, the amount of the thyristor gating angle can be directly calculated and recorded.

Once the lookup tables are created, the following method is performed during furnace operation.

1. Measure furnace load impedance for each phase through measurement of load current and voltage.

2. Obtain the desired power set-points for each phase.

3. Obtain the information on system configuration.

4. Find the appropriate lookup table corresponding to the desired per-phase power set-points and system configuration.

5. For each load impedance value read the corresponding amount of Xvar's from the lookup table. If the measured load impedance value lies in between the index values in the lookup table, find the corresponding Xvar value through interpolation.

6. Set the value of the variable reactors to the calculated value.

7. If the gating angles are stored in the lookup tables instead of the Xvar values, the values read are gating angles directly. If not, the reactance values are converted to gating angles.

Table 8 below shows an example of the application of the above method for 10 different cases of load impedance. The goal is to maintain the per-phase power set-points of 18, 18, and 20 MW (56 MW 3-phase) for a furnace load supplied by a 3-phase 3-wire system. In this case, the lower bound on Xvar is 0.

In all cases, with the exception of case 10, the 3-phase power set-point is maintained. In all cases, with the exception of cases 3, 8 and 10, the per-phase power set-points are achieved. Note that also for these cases, the negative sequence current (I2) values all become equal to 67 A. In cases 3 and 8, the per-phase power set-points cannot be maintained because the lower bound is reached in Xvar on at least one of the phases. In case 10, all Xvar values are set at zero to maximize the power and bring it closest the set-point value. However, this is done by neglecting meeting the per phase power set-points, as maintaining the 3-phase power level has the higher priority.

TABLE 8

Per-phase power stabilization with unequal set-points

| Case | Ra Ohms | Rb Ohms | Rc Ohms | XvarA Ohms | XvarB Ohms | XvarC Ohms | P MW | Pa MW | Pb MW | Pc MW | I1 A | I2 A |
|---|---|---|---|---|---|---|---|---|---|---|---|---|
| 1 | 12.2 | 12.2 | 12.2 | 8.4 | 7.9 | 5.6 | 56.0 | 18.0 | 18.0 | 20.0 | 1235 | 67 |
| 2 | 16.5 | 12.2 | 12.2 | 8.5 | 10.1 | 2.8 | 56.0 | 18.0 | 18.0 | 20.0 | 1168 | 67 |
| 3 | 22.1 | 12.2 | 12.2 | 7.7 | 11.6 | 0.0 | 56.0 | 18.0 | 18.7 | 19.3 | 1100 | 39 |
| 4 | 16.5 | 16.5 | 12.2 | 5.9 | 9.3 | 4.6 | 56.0 | 18.0 | 18.0 | 20.0 | 1117 | 67 |
| 5 | 22.1 | 16.5 | 12.2 | 5.5 | 11.3 | 0.5 | 56.0 | 18.0 | 18.0 | 20.0 | 1053 | 67 |
| 6 | 22.1 | 22.1 | 12.2 | 1.0 | 9.0 | 2.3 | 56.0 | 18.0 | 18.0 | 20.0 | 1005 | 67 |
| 7 | 16.5 | 16.5 | 16.5 | 7.7 | 5.5 | 3.7 | 56.0 | 18.0 | 18.0 | 20.0 | 1063 | 67 |
| 8 | 22.1 | 16.5 | 16.5 | 6.2 | 6.6 | 0.0 | 56.0 | 18.0 | 18.4 | 19.6 | 1009 | 49 |
| 9 | 22.1 | 22.1 | 16.5 | 1.3 | 3.4 | 0.4 | 56.0 | 18.0 | 18.0 | 20.0 | 964 | 67 |
| 10 | 22.1 | 22.1 | 22.1 | 0.0 | 0.0 | 0.0 | 52.6 | 17.5 | 17.5 | 17.5 | 890 | 0 |

Described below is a control method for 3 phase 3-wire furnace load per-phase current stabilization with unequal current set-points using independent control of in-line variable reactances. Current stabilization is defined as controlling the positive sequence component of the current.

The following pre-calculation is done off line and the resulting lookup tables are stored in the control system memory for reference.

1. Consider a set of desired per-phase current set-points $I_{spA}$, $I_{spB}$ and $I_{spC}$ 2. Consider a set of possible system impedances in different configurations (for instance each change of furnace transformer tap constitutes a change of system impedance)

3. Consider the known lower and upper bounds for the variable reactance.

4. Consider the expected range of the furnace load impedance in each phase

5. For each set of the 3-phase current set-points and system configuration, and each set of load impedance calculate the values for Xvar in each phase that meet the following equations:

$$|\overline{I_a}|=I_{spA},\ |\overline{I_b}|=I_{spB},\ |\overline{I_c}|=I_{spC}$$

where each Xvar is within the range limited by the upper and lower bounds.

6. If a feasible solution is not found in step 5 to meet the desired 3-phase current set-points, set all Xvar values to their upper or lower bound values in order to meet the value closest to the desired 3-phase average current set-point $(I_{spA}+I_{spB}+I_{spC})/3$.

7. Record the Xvar values obtained in 5 or 6 in a lookup table.

8. Continue through the set of load impedances until the lookup table is completed.

9. Repeat steps 5-8 for all other desired set-points and system configurations.

10. If the variable reactance is obtained through application of thyristors, instead of, or in addition to, calculating the Xvar value, the amount of the thyristor gating angle can be directly calculated and recorded.

Once the lookup tables are created, the following method is performed during furnace operation:

1. Measure furnace load impedance for each phase through measurement of load current and voltage.

2. Obtain the desired current set-points for each phase.

3. Obtain the information on system configuration.

4. Find the appropriate lookup table corresponding to the desired per-phase current set-points and system configuration.

5. For each load impedance value, read the corresponding amount of Xvar value from the lookup table. If the measured load impedance value lies in between in the index values in the lookup table, find the corresponding Xvar value through interpolation.

6. Set the value of the variable reactors to the calculated value.

7. If the gating angles are stored in the lookup tables instead of Xvar's, the values read are gating angles directly. If not, the reactance values are converted to gating angles.

Table 9 below shows an example of the application of the above method for 10 different cases of load impedance. The goal is to maintain the per-phase current set-points of 1065, 1065 and 1172 A for phases A, B and C respectively for a furnace load supplied by a 3-phase 3-wire system. In this case the lower bound on Xvar is 0.

In all cases, with the exception of cases 6, 8, 9, and 10, the per-phase current set-points are achieved. For these cases, the I2 values all become 72 A and all I1 values become 1099A. In cases 6 and 8, the per-phase current set-points cannot be maintained because the lower bound is reached in Xvar on at least one of the phases. However, the average 3-phase set-point (or positive sequence current) of 1099 A is achieved.

In cases 9 and 10, all Xvar values are set at zero to maximize the average 3-phase current and bring it closest the set-point value. However, this is done by neglecting the requirement to meet the per-phase current set-points, as maintaining the 3-phase current level has the higher priority.

TABLE 9

Per-phase current stabilization with unequal set-points

| Case | Ra Ohms | Rb Ohms | Rc Ohms | XvarA Ohms | XvarB Ohms | XvarC Ohms | P MW | Ia A | Ib A | Ic A | I1 A | I2 A | I2 % of I1 |
|------|---------|---------|---------|------------|------------|------------|------|------|------|------|------|------|-----------|
| 1 | 12.2 | 12.2 | 12.2 | 12.4 | 9.6 | 8.4 | 44.4 | 1065 | 1065 | 1172 | 1099 | 72 | 6.6 |
| 2 | 16.5 | 12.2 | 12.2 | 11.3 | 10.7 | 4.9 | 49.2 | 1065 | 1065 | 1172 | 1099 | 72 | 6.6 |
| 3 | 20.7 | 12.2 | 12.2 | 9.8 | 11.3 | 1.1 | 54.1 | 1065 | 1065 | 1171 | 1099 | 72 | 6.6 |
| 4 | 16.5 | 16.5 | 12.2 | 7.0 | 8.5 | 5.7 | 54.1 | 1065 | 1065 | 1172 | 1099 | 72 | 6.6 |
| 5 | 20.7 | 16.5 | 12.2 | 4.9 | 8.6 | 1.4 | 58.9 | 1065 | 1065 | 1171 | 1099 | 72 | 6.6 |
| 6 | 20.7 | 20.7 | 12.2 | 0.0 | 4.5 | 0.2 | 63.4 | 1067 | 1038 | 1196 | 1098 | 100 | 9.1 |
| 7 | 16.5 | 16.5 | 16.5 | 6.6 | 2.8 | 3.2 | 59.9 | 1065 | 1065 | 1171 | 1099 | 72 | 6.6 |
| 8 | 20.7 | 16.5 | 16.5 | 1.2 | 0.0 | 0.0 | 64.4 | 1010 | 1141 | 1150 | 1099 | 89 | 8.1 |
| 9 | 20.7 | 20.7 | 16.5 | 0.0 | 0.0 | 0.0 | 60.3 | 977.2 | 999 | 1096 | 1023 | 74 | 7.3 |
| 10 | 20.7 | 20.7 | 20.7 | 0.0 | 0.0 | 0.0 | 56.1 | 949.7 | 950 | 950 | 949.7 | 0 | 0.0 |

Figure 14:
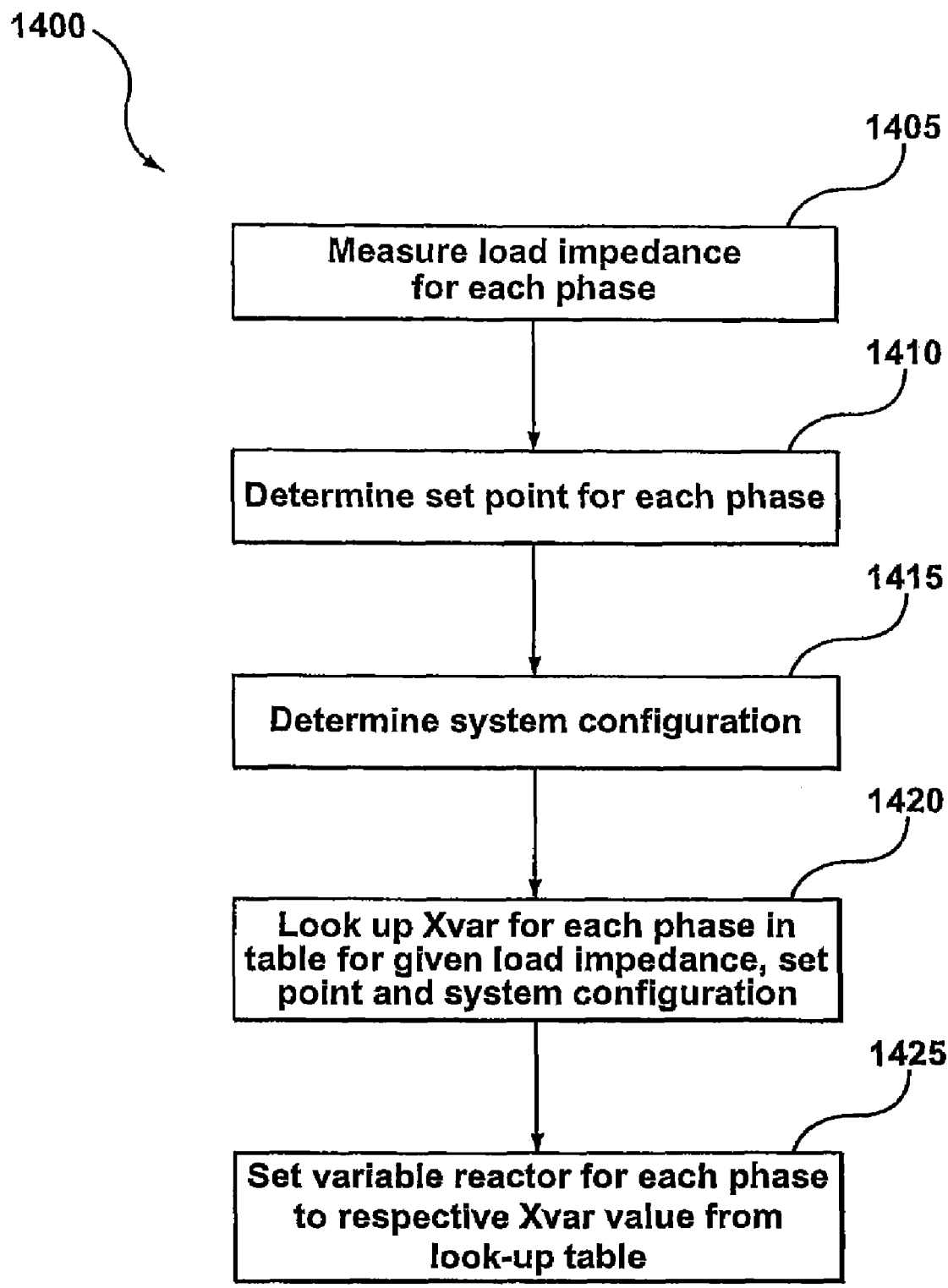
FIG. 14 is a flowchart of a method of compensation according to one embodiment.
Figure 15:
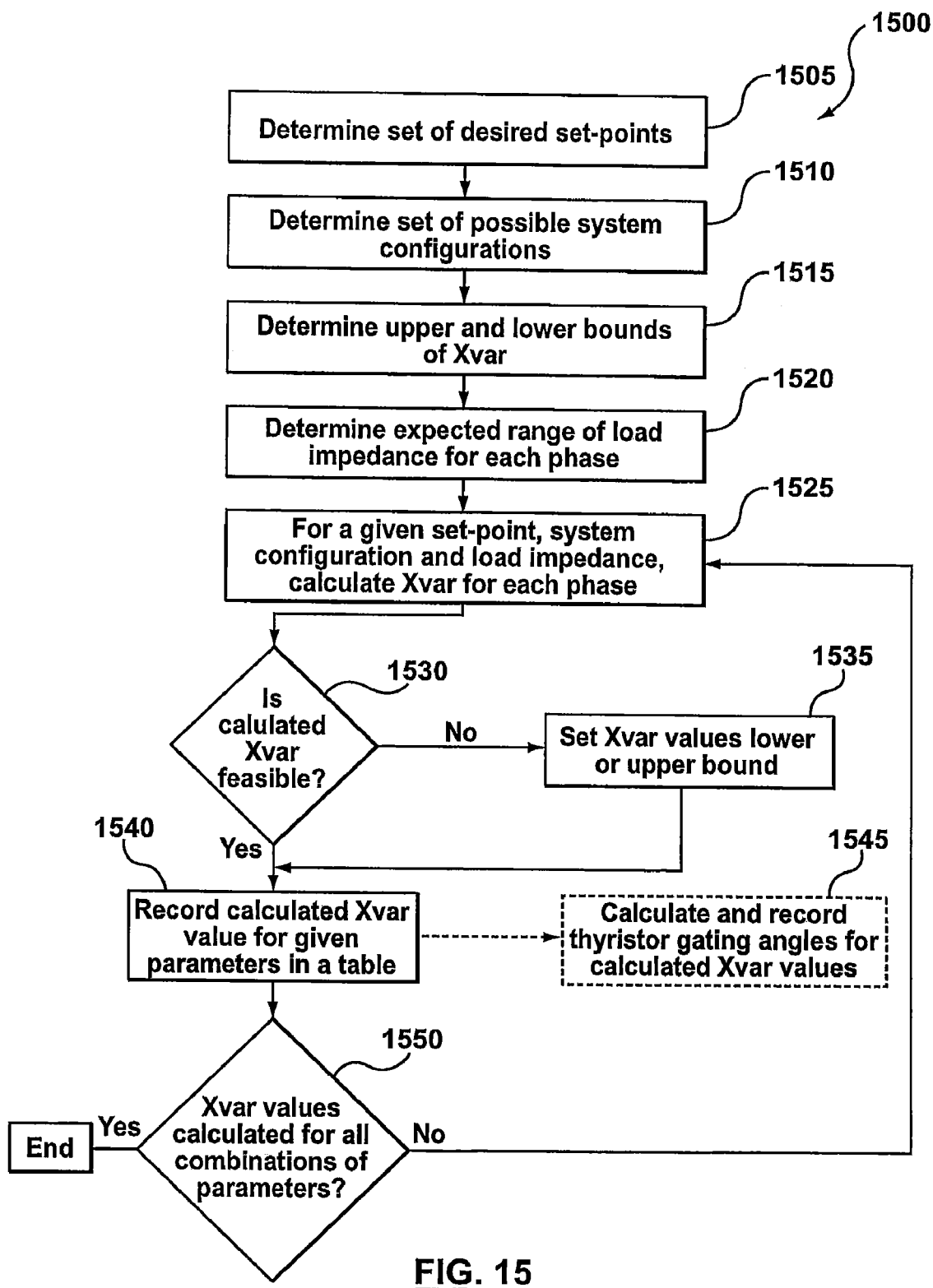
FIG. 15 is a flowchart of a method of generating a lookup table according to another embodiment.

Referring now to FIGS. 14 and 15, a generalized version of the above-described control methods is described. FIG. 14 is a flowchart of a method of compensation in a multi-phase electrical furnace. FIG. 15 is a flowchart of a method of generating look-up tables for use in the method of compensation.

The method of compensation illustrated in FIG. 14 is designated by reference numeral 1400 and begins at step 1405, at which the load impedance is measured for each phase. At step 1410, a set-point for each phase is determined. The set-point may be a power, current, unbalance or other set-point relevant for the purposes of furnace stability and control. At step 1415, the control system configuration is determined.

At step 1420, the central controller 200 uses the measured impedance for each phase, the set-point and system configuration to look up the appropriate variable reactance values in a look-up table. Accordingly, the variable reactance values are determined as a function of impedance characteristics on all phases. At step 1425, the variable reactors are set for each phase to the respective variable reactance value determined from the look-up table at step 1420. Method 1400 is performed by, or under the supervision of, central controller 200 for each furnace 101.

The method of generating a look-up table illustrated in FIG. 15 is designated by reference numeral 1500 and begins at step 1505, at which a desired set of set-points is determined. At step 1510, a set of possible system configurations is determined. At step 1515, the upper and lower bounds on the variable reactors is determined. At step 1520, the expected range of variation in load impedance is determined for each phase.

At step 1525, the variable reactance value for each phase is calculated for a given set-point, system configuration and load impedance. At step 1530, central controller 200 checks whether the variable reactance value for each phase calculated at step 1525 is feasible. If it is not feasible, for example because it is outside the performance limits of the variable reactor, the variable reactance value is set to its lower or upper bound (limit) value, as appropriate, at step 1535. If the calculated variable reactance value is feasible, it is recorded in the look-up table at step 1540. Optionally, the variable reactance value may be used to calculate and record corresponding thyristor gating angles, at step 1545.

At step 1550, central controller 200 checks whether the variable reactance values have been calculated for all combinations of parameters determined in steps 1505 to 1520. If not all combinations of parameters have been used for calculating the variable reactance values, the method returns to step 1525 to perform the remainder of the calculations and create the necessary look-up tables, as necessary. Method 1500 is performed by central controller 200 while the furnace system is offline. The look-up tables generated according to method 1500 are then used in compensation method 1400.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

The invention claimed is:

1. A control system for controlling a multi-phase electric furnace coupled to a multi-phase power supply, the control system comprising:
    a variable reactor coupled between each phase of the multi-phase electric furnace and the respective phase of the multi-phase power supply;
    monitoring means coupled to each variable reactor for monitoring an operating characteristic of each phase of the electric furnace and for determining whether the operating characteristic of at least one phase deviates from a respective set-point;
    control means coupled to each variable reactor and the monitoring means for setting a value of each variable reactor according to the set-point of the phase to which it is coupled, the control means being configured to set the value of each variable reactor to achieve a respective set-point based on the operating characteristic on all phases in response to determination by the monitoring means that the operating characteristic of at least one phase deviates from the respective set-point.

2. The control system claimed in claim 1, wherein the control means has access to a memory containing a lookup table, and wherein the control means sets the values based on the lookup table.

3. The control system claimed in claim 1, wherein the set-point comprises a power set-point and wherein the operating characteristic comprises power consumption.

4. The control system claimed in claim 3, wherein the monitoring means determines a difference between the power set-point for the at least one phase and the power consumption for the at least one phase, and wherein the control means includes a reactance selection component for selecting an adjusted value based upon the difference.

5. The control system claimed in claim 1, wherein the set-point comprises a current set-point and wherein the operating characteristic comprises current draw.

6. The control system of claim 1, wherein at least one of the set-points for one of the phases differs from another of the set-points for another of the phases.

7. The control system of claim 1, wherein the operating characteristic is an impedance characteristic.

8. The control system of claim 1, further comprising a central controller comprising the monitoring means and the control means.

9. The control system of claim 1, further comprising a variable reactance controller coupled to each variable reactor for setting the value of the respective variable reactor and a central controller comprising the monitoring means, the central controller being coupled to each variable reactance controller and controlling each variable reactance controller.

10. The control system claimed in claim 1, wherein the multi-phase electric furnace is a three-phase electric arc furnace.

11. A method of controlling a multi-phase electric furnace, each phase being coupled to a multi-phase power supply through an associated variable reactor and having a set-point, the method comprising the steps of: monitoring an operating characteristic and a value of the variable reactor for each phase;
determining whether the operating characteristic of at least one of the phases deviates from the respective set-point; and
adjusting the values of the variable reactors when it is determined that the operating characteristic of the at least one of the phases deviates from the respective set-point, based on the operating characteristics of all phases, wherein the step of adjusting includes accessing a lookup table storing reactance values and reading the reactance values from the lookup table based on the operating characteristics of all phases.

12. A control system for controlling unbalance of a multi-phase electric furnace, each phase being coupled to a power supply, the control system comprising:
a variable reactor associated with each of the phases, each variable reactor being coupled between its associated load and the power supply; and
a control means coupled to each variable reactor, the control means including an unbalance determination component for monitoring an operating characteristic of each phase and for determining an unbalance value for the multi-phase electric furnace, and a reactance adjustment component responsive to the unbalance determination component for controlling the variable reactors based upon the operating characteristics on all phases to maintain a predetermined degree of unbalance, wherein the unbalance determination component includes a component for measuring phase current and a component for calculating a negative sequence current value based upon the phase current, and wherein the unbalance value comprises the negative sequence current value.

13. The control system claimed in claim 12, wherein the reactance adjustment component includes a calculation component for calculating a current change required in at least one phase to minimize the negative sequence current value.

14. The control system claimed in claim 12, wherein the reactance adjustment component includes a calculation component for calculating a current change required in at least one phase to maintain the predetermined degree of unbalance.

15. A method of controlling a multi-phase electric furnace, each phase being coupled to a power supply through an associated variable reactor, the method comprising the steps of:
monitoring an operating characteristic of each phase;
determining an unbalance value for the multi-phase electric furnace load; and
controlling the variable reactors based on the unbalance value and the operating characteristics on all phases to maintain a predetermined degree of unbalance;
wherein the step of monitoring includes measuring phase current and wherein the step of determining includes calculating a negative sequence current value based upon the phase current, and wherein the unbalance value comprises the negative sequence current value.

16. The method claimed in claim 15, wherein the step of controlling includes calculating a current change required in at least one phase to minimize the negative sequence current value.

17. The method claimed in claim 15, wherein the step of controlling includes calculating a current change required in at least one phase to maintain the predetermined degree of unbalance.

18. A control system for controlling unbalance in one or more three-phase loads, the three-phase loads being coupled to a three-phase power supply, the control system comprising:
a variable reactor associated with each phase, each variable reactor being coupled between the three-phase load and an associated phase of the power supply;
a variable reactance control system associated with each variable reactor for monitoring an operating characteristic of its associated phase and for setting a value of the respective variable reactor in response to the operating characteristic so as to maintain a set-point; and
a central control system coupled to each variable reactance control system, wherein the central control system includes:
a detection component for determining an unbalance value for the three-phase load and for determining whether the value of the variable reactor has reached a threshold value, and
an override component responsive to the detection component for outputting a control signal to the variable reactance control systems,
wherein the variable reactance control systems each include an interface for receiving the control signal, in response to which the variable reactance control systems adjust the variable reactors.

19. The control system claimed in claim 18, wherein the override component includes an override calculation component for calculating an override setting for each of the variable reactors, and wherein the control signal includes the override setting.

20. The control system claimed in claim 18, wherein the detection component includes a component for measuring phase current and a component for calculating a negative sequence current value based upon the phase current, and wherein the unbalance value comprises the negative sequence current value.

21. The control system claimed in claim 20, wherein the override component includes an override calculation component for calculating a current change required in at least one phase to minimize the negative sequence current value.

22. The control system claimed in claim 20, wherein the override component includes an override calculation component for calculating a current change required in at least one phase to maintain a predetermined unbalance value.

23. The control system claimed in claim 20, wherein the override component includes an override component for determining a current change required in at least one phase, and wherein the central control system includes a memory storing a lookup table, and wherein the override component reads the current change from the lookup table.

24. The control system claimed in claim 18, wherein the control signal includes override duration.

25. The control system claimed in claim 18, wherein the one or more three-phase loads comprise at least two three-phase loads, wherein the detection component measures the unbalance value for each of the at least two three-phase loads, and wherein the control signal instructs the variable reactance control systems to unbalance one of the at least two three-phase loads to compensate for unbalance present in another of the at least two three-phase loads.

26. The control system claimed in claim 18, wherein the operating characteristic includes power draw and wherein the set-point comprises a power set-point.

27. The control system claimed in claim 18, wherein the one or more three-phase loads comprise one or more electric arc furnaces.

28. A method for controlling unbalance in one or more three-phase loads, each three-phase load being coupled to a three-phase power supply, each phase being coupled to the three-phase load through an associated variable reactor, each associated variable reactor being coupled to a corresponding variable reactance control system for monitoring an operating characteristic of the phase and for setting a value of the variable reactor in response to the operating characteristic so as to maintain a set-point, and wherein a central control system is coupled to the variable reactance control systems, the method comprising the steps of:
    at the central control system, calculating an unbalance value for the three-phase load;
    determining whether the unbalance value exceeds a predetermined threshold;
    outputting a control signal from the central control system to the variable reactance control systems if the unbalance value exceeds the threshold; and
    on at least one of the phases, adjusting the associated variable reactor in response to the control signal to reduce the unbalance value below the threshold.

29. The method claimed in claim 28, wherein the step of outputting includes calculating an override setting for each of the variable reactors, and wherein the control signal includes the override setting.

30. The method claimed in claim 28, wherein the step of calculating includes measuring phase current and calculating a negative sequence current value based upon the phase current, and wherein the unbalance value comprises the negative sequence current value.

31. The method claimed in claim 30, further including a step of determining a current change required in at least one phase to minimize the negative sequence current value, and wherein the control signal includes the current change.

32. The method claimed in claim 31, wherein the central control system includes a memory storing a lookup table, and wherein the step of determining a current change includes reading the current change from the lookup table.

33. The method claimed in claim 30, further including a step of determining a current change required in at least one phase to maintain a predetermined unbalance value, and wherein the control signal includes the current change.

34. The method claimed in claim 28, wherein the control signal includes an override duration.

35. The method claimed in claim 28, wherein the one or more three-phase loads comprise at least two three-phase loads, wherein the step of calculating includes calculating the unbalance value for each of the at least two three-phase loads, and wherein the control signal instructs the variable reactance control systems to unbalance one of the at least two three-phase loads to compensate for unbalance present in another of the at least two three-phase loads.

36. The method claimed in claim 28, wherein the operating characteristic includes power and wherein the set-point comprises a power set-point.

37. The method claimed in claim 28, wherein the three-phase loads comprise one or more electric arc furnaces.

38. A method of controlling a multi-phase electric furnace, each phase being coupled to a power supply through an associated variable reactor, the method comprising the steps of:
    monitoring an operating characteristic of each phase; and
    controlling the variable reactors based on the operating characteristics on all phases to maintain a set-point on each phase,
    wherein at least one of the set-points for one of the phases differs from another of the set-points for another of the phases.

* * * * *